(12) United States Patent
Furuta et al.

(10) Patent No.: US 7,305,499 B2
(45) Date of Patent: Dec. 4, 2007

(54) DMA CONTROLLER FOR CONTROLLING AND MEASURING THE BUS OCCUPATION TIME VALUE FOR A PLURALITY OF DMA TRANSFERS

(75) Inventors: Akihiro Furuta, Kawasaki (JP); Nobuo Higaki, Kobe (JP); Tetsuya Tanaka, Kyoto (JP); Tsuneyuki Suzuki, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 595 days.

(21) Appl. No.: 10/901,294

(22) Filed: Jul. 29, 2004

(65) Prior Publication Data

US 2005/0050241 A1    Mar. 3, 2005

(30) Foreign Application Priority Data

Aug. 1, 2003    (JP)    ............... P. 2003-285080

(51) Int. Cl.
*G06F 13/28* (2006.01)
*G06F 13/36* (2006.01)

(52) U.S. Cl. ............... 710/22; 710/17; 710/18; 710/23; 710/25; 710/113; 710/240; 710/244

(58) Field of Classification Search ............ 710/22, 710/17, 18, 25, 23, 113, 240, 244
See application file for complete search history.

(56) References Cited

U.S. PATENT DOCUMENTS 5,535,362 A    7/1996    Ami et al.
5,630,172 A    5/1997    Ami et al.
5,884,095 A    3/1999    Wolford et al.
6,119,176 A *   9/2000    Maruyama ............... 710/25
6,473,817 B1*  10/2002    Jeddeloh ................. 710/113

(Continued)

FOREIGN PATENT DOCUMENTS

EP    1 156 422    11/2001

(Continued)

OTHER PUBLICATIONS

Japanese Office Action issued in corresponding Japanese Patent Application No. JP 2003-285080, dated Jul. 12, 2006.

*Primary Examiner*—Tammara Peyton
(74) *Attorney, Agent, or Firm*—McDermott Will & Emery LLP

(57) ABSTRACT

The present invention provides a DMA transfer controller includes: a transfer parameter storing unit for storing a bus occupation time value and transfer parameters of one set or a plurality of sets of DMA transfers for each of a plurality of logical processors; a data transfer performing unit for performing the DMA transfer on the basis of the DMA transfer parameters; a control unit for controlling the receive and transmit of the DMA transfer parameters and the start and the interruption of the DMA transfers; and a time measuring unit for starting to measure bus occupation elapse time when a first DMA transfer is started for each of the logical processors. When the bus occupation elapse time reaches the bus occupation time value, the control unit interrupts the DMA transfer that is currently performed to start the DMA transfers based on the transfer parameters related to the logical processors of a prescribed sequence.

19 Claims, 24 Drawing Sheets

U.S. PATENT DOCUMENTS 6,542,940 B1    4/2003   Morrison et al.
6,820,187 B2 *  11/2004  Asano et al. .................. 712/21
7,054,970 B2 *  5/2006   Kim ........................... 710/113

FOREIGN PATENT DOCUMENTS

| JP | 5-250305 | 9/1993 |
| JP | 8-30549 | 2/1996 |
| JP | 09-223102 | 8/1997 |
| JP | 9-223102 | 8/1997 |
| JP | 2000-132505 A | 5/2000 |
| JP | 2001-075917 A | 3/2001 |
| JP | 2002-41445 | 2/2002 |

* cited by examiner

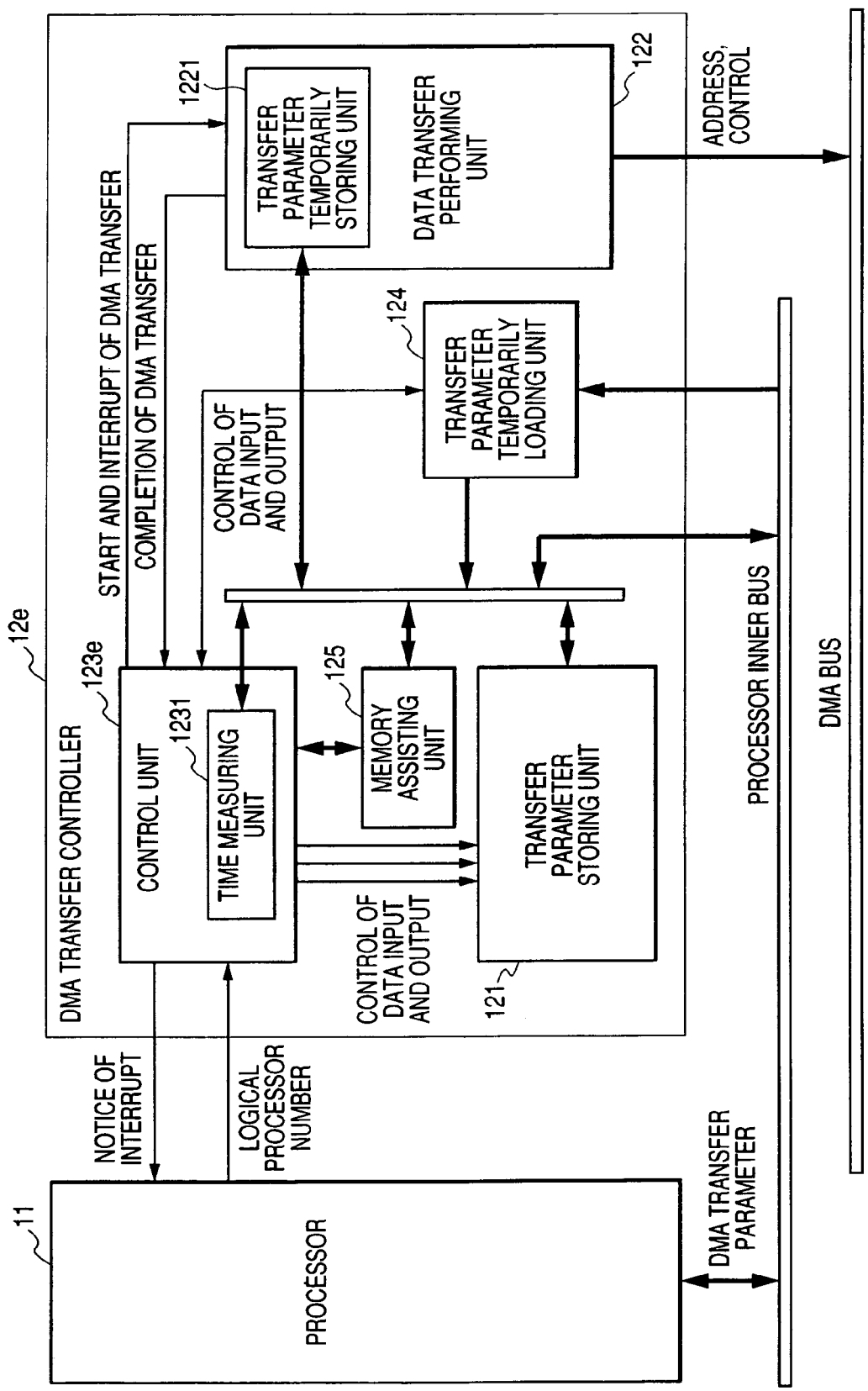

FIG. 23

INITIAL STATE

| | |
|---|---|
| P0 | UNUSED |
| P1 | TRANSFER PARAMETER FOR SECOND OF QUEUE |
| P2 | UNUSED |
| P3 | TRANSFER PARAMETER FOR QUEUE TOP |
| P4 | TRANSFER PARAMETER FOR THIRD OF QUEUE |
| P5 | UNUSED |
| | QUEUE CONTROL INFORMATION |
| | BUS OCCUPATION TIME |

DETAIL OF QUEUE CONTROL INFORMATION

| QUEUE #5 | | QUEUE #4 | | QUEUE #3 | | QUEUE #2 | | QUEUE #1 | | QUEUE #0 (QUEUE TOP) | |
|---|---|---|---|---|---|---|---|---|---|---|---|
| 0 | INVALID | 0 | INVALID | 0 | INVALID | 1 | P4 | 1 | P1 | 1 | P3 |

CURRENT QUEUE BOTTOM (under QUEUE #2)

STATE AFTER COMPLETION OF DMA TRANSFER OF QUEUE TOP

| | |
|---|---|
| P0 | UNUSED |
| P1 | TRANSFER PARAMETER FOR QUEUE TOP |
| P2 | UNUSED |
| P3 | UNUSED |
| P4 | TRANSFER PARAMETER FOR SECOND OF QUEUE |
| P5 | UNUSED |
| | QUEUE CONTROL INFORMATION |
| | BUS OCCUPATION TIME |

DETAIL OF QUEUE CONTROL INFORMATION

| QUEUE #5 | | QUEUE #4 | | QUEUE #3 | | QUEUE #2 | | QUEUE #1 | | QUEUE #0 (QUEUE TOP) | |
|---|---|---|---|---|---|---|---|---|---|---|---|
| 0 | INVALID | 0 | INVALID | 0 | INVALID | 0 | INVALID | 1 | P4 | 1 | P1 |

CURRENT QUEUE BOTTOM (under QUEUE #1)

FIG. 24

INITIAL STATE

| | |
|---|---|
| P0 | UNUSED |
| P1 | TRANSFER PARAMETER FOR SECOND OF QUEUE |
| P2 | UNUSED |
| P3 | TRANSFER PARAMETER FOR QUEUE TOP |
| P4 | TRANSFER PARAMETER FOR THIRD OF QUEUE |
| P5 | UNUSED |
| | QUEUE CONTROL INFORMATION |
| | BUS OCCUPATION TIME |

DETAIL OF QUEUE CONTROL INFORMATION

| QUEUE #5 | | QUEUE #4 | | QUEUE #3 | | QUEUE #2 | | QUEUE #1 | | QUEUE #0 (QUEUE TOP) | |
|---|---|---|---|---|---|---|---|---|---|---|---|
| 0 | INVALID | 0 | INVALID | 0 | INVALID | 1 | P4 | 1 | P1 | 1 | P3 |

CURRENT QUEUE BOTTOM (QUEUE #2)

STATE IN DELETION OF SECOND OF QUEUE

| | |
|---|---|
| P0 | UNUSED |
| P1 | UNUSED |
| P2 | UNUSED |
| P3 | TRANSFER PARAMETER FOR QUEUE TOP |
| P4 | TRANSFER PARAMETER FOR SECOND OF QUEUE |
| P5 | UNUSED |
| | QUEUE CONTROL INFORMATION |
| | BUS OCCUPATION TIME |

DETAIL OF QUEUE CONTROL INFORMATION

| QUEUE #5 | | QUEUE #4 | | QUEUE #3 | | QUEUE #2 | | QUEUE #1 | | QUEUE #0 (QUEUE TOP) | |
|---|---|---|---|---|---|---|---|---|---|---|---|
| 0 | INVALID | 0 | INVALID | 0 | INVALID | 0 | INVALID | 1 | P4 | 1 | P3 |

CURRENT QUEUE BOTTOM (QUEUE #1)

DMA CONTROLLER FOR CONTROLLING AND MEASURING THE BUS OCCUPATION TIME VALUE FOR A PLURALITY OF DMA TRANSFERS

BACKGROUND OF THE INVENTION

1. Field of the Invention

The present invention relates to a DMA transfer controller capable of a time control of a DMA transfer.

2. Description of the Related Art

In recent years, with the progress of the multi-media of devices, audio data or a moving image (AV) has been ordinarily encoded or decoded on a processor. Generally, when the AV is decoded, a prescribed amount of process needs to be completed within a prescribed time. Namely, a real time process is necessary. Further, in the interactive communication of the audio data and the moving image, an encoding process also needs to be performed in a real time.

When a plurality of processes including such real time processes are performed on a single processor, a mechanism for ensuring the real time characteristics of the processes is necessary. As one of methods for realizing this mechanism, there is a system that the time division of resources of the processor is carried out and the contents of the processes are changed for each prescribed time. This system is generally equivalent to a system that a plurality of virtual logical processors performs respectively different processes in parallel. This system is called a virtual multi-processing (VMP), hereinafter.

In the AV process, a large quantity of data needs to be transferred via an inner data bus between an input and output device, a buffer memory (a temporarily storing memory of data) and a work memory (a data processing memory). Ordinarily, the resources of the processor are not preferably consumed for the transfer of data. Thus, the data is ordinarily transferred by using a DMA (direct memory access) controller.

With the recent increase of the throughput of information in a system LSI, a quantity of data transferred in an inner bus of the LSI is also steadily increasing. To efficiently transfer the data, a high functional DMA controller is likewise required. Various kinds of DMA controllers have been proposed. For instance, a DMA controller in which priority is given to a plurality of DMA transfers in order to improve a transfer efficiency (see Patent Document 1: JP-A-9-223102) or a DMA controller in which a plurality of DMA transfers are reserved and performed (see Patent Document 2: JP-A-2002-41445) are devised.

FIG. 2 is a block diagram showing a structural example of a system with which a usual DMA controller is loaded. In FIG. 2, a microprocessor unit (MPU) 1 includes a processor 11, an inner DMA controller 12, an external DMA bus interface 13 and inner memories 14 and 15 and 16. Members 11 to 16 are respectively connected to a processor inner bus and an inner DMA bus mounted on the MPU. Further, MPU1, an external DMA controller 2, a peripheral circuit 3, an external memory 4 and a peripheral circuit 5 are connected to an external DMA bus of the MPU.

Now, a case that compressed audio data is read from a storage device (for instance, a semiconductor memory card) by using the system shown in FIG. 2, decoded and then the decoded data is outputted from an audio interface circuit is considered. In this case, the peripheral circuit 3 serves as an interface circuit to the semiconductor memory card and the peripheral circuit 5 serves as the audio interface circuit.

To uninterruptedly reproduce the audio data, a program (refer it to as a program C) for performing an audio data decoding process needs real time characteristics. Further, two programs A and B having non-real time characteristics are performed in parallel with the audio decoding program C. The operations of the processor 11 and the inner DMA controller 12 are shown in a timing chart in FIG. 3.

The flow of the data and processes in the audio decoding process are described below.

(Process 1) The external DMA controller 2 always transfers the compressed audio data from the peripheral circuit 3 to the external memory 4. This process does not need to be paid attention to when the operation of the inner DMA controller 12 is considered.

(Process 2) The inner DMA controller 12 transfers the results of a past decoding process to the peripheral circuit 5 from the inner memory 14. This DMA transfer is started by the program C.

(Process 3) When the DMA transfer of the process 2 is completed, the inner DMA controller 12 informs the processor 11 of an interrupt. Thus, the program C starts a next DMA transfer and the inner DMA controller 12 transfers new compressed data to the inner memory 14 from the external memory 4 subsequently to the process 2. In the processes 2 and 3, the inner memory 14 is used as a buffer memory.

(Process 4) In the processor 11, a decoding process of data held in the inner memory 15 is performed in parallel with the above-described processes 2 and 3. In this process, the inner memory 15 is used as a work memory.

The processes 2 to 4 are repeated for each prescribed unit time for processing and the uses of the inner memories 14 and 15 are alternately changed for each unit time. That is, the inner memory 14 is used as the buffer memory for a prescribed time and is used as the work memory for another time. This may be applied to the inner memory 15.

In this system, to assure the real time characteristics of the program C, the programs A, B and C are performed in time division as shown in FIG. 3. This state may be considered to be a state that the programs A, B, and C are performed by respectively individual virtual logical processors. In the case of the audio data decoding process, the "unit time for processing" shown in FIG. 3 is ordinarily determined from an encoding system, the output data rate (a quantity of output data per unit time) of the peripheral circuit, the capacity of a buffer, etc.

Further, in this system, since the virtual multi-processing is introduced, when the programs (A, B, C) are respectively developed, the contents of processes or the executing time of other programs do not need to be taken into consideration. On the assumption that the prescribed resources of the processor are respectively assured for the programs, the development of the programs can be independently advanced. Namely, the virtual multi-processing not only can assure a real time process, but also has an advantage that the programs can be easily developed. Further, because of the same reasons, the programs A and B can be easily transported to another system having different unit time for processing.

Now, to show the problems of this system, a case that a specific program occupies a DMA bus for a long time is considered. In an operational example shown in a timing chart of FIG. 4, the program B performs the DMA transfer having a large quantity of transfer and occupies the DMA bus for a long time. When this DMA transfer is completed and the DMA bus is opened, the program C performs the DMA transfer to the peripheral circuit 5 from the inner memory 15. After the transfer is completed, the program C informs the processor 11 of an interrupt.

However, in the timing chart shown in FIG. 4, when the processor 11 is informed of the interrupt, the process of the program C is already completed, so that a next DMA transfer cannot be subsequently activated. When the program C starts the data process of the inner memory 15, since data to be processed has not been transferred, a real time process fails.

Some methods for avoiding such a situation may be considered. One of the methods is that a plurality of DMA transfers are subscribed and performed. That is, as shown in a timing chart of FIG. 5, a DMA transfer request for the inner memory 15 may be previously subscribed from the external memory. After the DMA transfer is completed from the inner memory 15 to the peripheral circuit 5, the subscribed DMA transfer may be automatically performed. Specifically, this process can be realized by using the DMA controller disclosed in the Patent Document 2.

However, even when the plurality of DMA transfers can be subscribed and performed, the real time characteristics of the program C may not be possibly assured. For instance, in an operational example shown in a timing chart of FIG. 6, since the DMA transfer time of the program B is long, the completion of the DMA transfer is not finished until the process of the inner memory 15 is started. Thus, the real time process fails.

Finally, to assure a DMA bus access for a prescribed time for the DMA transfer of the program C, there is no other assured method than a method that a restriction is applied to the start timing and transfer time (or the number of transferred words) of the DMA transfers activated by the programs A and B. As apparent from the above-described consideration, when a real time process is carried out, only the time division (an introduction of VMP) of the resources of the processor is insufficient and a time control (scheduling) of the DMA transfer needs to be considered together.

As described above, in the development of the programs A and B, when these programs perform a DMA transfer request, the real time process of the program C needs to be considered so as not to fail. However, in the development of the programs A, B and C, a dependent relation is thus generated between them, so that the programs cannot be independently progressively developed. In such a way, the advantage of the VMP that the programs are easily developed is seriously damaged due to the scheduling of the DMA transfers.

Further, in the AV encoding/decoding process, since time required for the process is different depending on the encoding system or the input and output data rate, the unit time for processing may have various values. Thus, in all cases, it is necessary to assure that the system does not fail.

Further, when a plurality of real time processes are congested, the development of the system and the number of inspecting processes are enormously increased. In addition thereto, the scheduling itself having no failure of the system may be sometimes hardly performed.

SUMMARY OF THE INVENTION

The present invention is proposed by taking the above-described usual problems into consideration. It is an object of the present invention to provide a DMA transfer controller (a DMA controller) in which the scheduling of DMA transfers does not need to be thought by scheduling the DMA transfers in real time processes, the development or transportation of the programs are easy and a system does not fail in the real time processes.

A DMA transfer controller according to the present invention comprises: a transfer parameter storing unit for storing a bus occupation time value and transfer parameters of one set or a plurality of sets of DMA transfers for a plurality of logical processors performed by a main processor; a data transfer performing unit for performing the DMA transfers on the basis of the transfer parameters; a control unit for controlling the receive and transmit of the transfer parameters and the start and the interruption of the DMA transfers; and a time measuring unit for starting to measure bus occupation elapse time when a first DMA transfer is started for each of the logical processors. When the bus occupation elapse time reaches the bus occupation time value, the control unit interrupts the DMA transfer that is performed to start the DMA transfers based on the transfer parameters related to the logical processors of a prescribed sequence.

According to the above-described structure, since the bus occupation elapse time for each of the logical processors can be limited to the bus occupation time value, the scheduling of the DMA transfers in real time processes can be carried out, a system can be avoided from being broken down and the real time characteristics of the processes can be certainly assured.

Further, when the bus occupation elapse time reaches the bus occupation time value to interrupt the DMA transfer that is currently performed, since a DMA transfer to be subsequently performed is automatically started without using a program, individual programs do not need to care about the scheduling of the DMA transfers. Thus, the development or maintenance of the programs can be easily carried out.

Further, the DMA transfer controller according to the present invention, when all DMA transfers related to a certain logical processor are completed before the bus occupation elapse time reaches the bus occupation time value, the control unit starts the DMA transfers based on the transfer parameters related to the logical processors of the prescribed sequence.

According to the above-described structure, even when there is room in bus occupation time upon completion of all the DMA transfers related to the certain logical processor, a bus occupation is finished to start a DMA transfer to be subsequently performed. Thus, wasteful time for bus occupation can be eliminated to improve a DMA transfer efficiency.

A DMA transfer controller according to the present invention comprises: a transfer parameter storing unit for storing the number of transfer data capable of occupying a bus and transfer parameters of one set or a plurality of sets of DMA transfers for a plurality of logical processors performed by a main processor; a data transfer performing unit for performing the DMA transfers on the basis of the transfer parameters; a control unit for controlling the receive and transmit of the transfer parameters and the start and the interruption of the DMA transfers; and a number measuring unit for starting to measure the number of transfer data when a first DMA transfer is started for each of the logical processors. When the number of bus transfer data reaches the number of transfer data capable of occupying the bus, the control unit interrupts the DMA transfer that is currently performed to start the DMA transfers based on the transfer parameters related to the logical processors of a prescribed sequence.

According to the above-described structure, even when the number of transfer data capable of occupying the bus is used in place of the bus occupation time value to measure the number of bus transfer data in place of the bus occupation elapse time, the scheduling of the DMA transfers equivalent to that of the DMA transfer controller for measuring the bus occupation elapse time can be performed. Accordingly, the same effects to those of the above-described DMA transfer controller can be obtained in real time processes.

Further, in the DMA transfer controller according to the present invention, when all DMA transfers related to a certain logical processor are completed before the number of bus transfer data reaches the number of transfer data capable of occupying the bus, the control unit starts the DMA transfers based on the transfer parameters related to the logical processors of the prescribed sequence.

According to the above-described structure, even when the number of transfer data capable of occupying the bus is used in place of the bus occupation time value to measure the number of bus transfer data in place of the bus occupation elapse time, processes equivalent to those of the DMA transfer controller for measuring the bus occupation elapse time can be performed. Accordingly, wasteful time for bus occupation can be eliminated and a DMA transfer efficiency can be improved.

Further, in the DMA transfer controller according to the present invention, the prescribed sequence is cyclic and all DMA transfer processes related to the logical processors for which a DMA transfer request is not present are skipped.

According to the above-described structure, since only the DMA transfers related to the logical processors for which the DMA transfer request is present are cyclically processed, a wasteful time for bus occupation can be eliminated and a DMA transfer efficiency can be improved to a maximum.

Further, in the DMA transfer controller according to the present invention, the plurality of sets of transfer parameters for each of the plurality of processors queue to a FIFO structure by the transfer parameter storing unit.

According to the above-described structure, the transfer parameters queue to the FIFO structure to control the DMA transfer. Thus, an overhead required for the interrupt of the completion of the DMA transfer to the start of a next DMA transfer is not necessary so that the DMA transfer efficiency can be improved.

Further, in the DMA transfer controller according to the present invention, when the transfer parameters queue by exceeding the prescribed maximum number of the transfer parameters, the control unit informs the main processor of the generation of an error.

According to the above-described structure, since the transfer parameters can be prevented from queuing by exceeding the prescribed maximum number of transfer parameters, an unexpected operation such as the damage of the already queuing transfer parameters can be prevented.

In the DMA transfer controller according to the present invention, one set of transfer parameters can queue before the first queue of the transfer parameters as an emergent queue.

According to the above-described structure, since the queuing of the emergent queue is carried out with a priority higher than that of the ordinary transfer parameters, the DMA transfer related to the generation of a phenomenon requiring an instantaneous responsiveness is treated as the emergent queue and most preferentially executed.

In the DMA transfer controller according to the present invention, while the emergent queue queues, when the queuing operation of the emergent queue is to be further carried out, the control unit informs the main processor of the generation of an error.

According to the above-described structure, since the emergent queue can be prevented from queuing twice, an unexpected operation such as the damage of the already queuing transfer parameters can be prevented.

The DMA transfer controller according to the present invention further comprises a mechanism for nullifying the transfer parameters for each of the logical processors.

According to the above-described structure, since the transfer parameters can be nullified for each of the logical processors, a case in which an application is invalidated during the execution of the operation can be met. Further, a speculative execution of a DMA request can be performed to increase the degree of freedom in preparing the application.

Further, the DMA transfer controller according to the present invention further comprises a mechanism for nullifying individually the transfer parameters.

According to the above-described structure, since the transfer parameters can be individually nullified, a case in which the number of transfer data is changed halfway can be met. Further, a speculative execution of a DMA request can be performed to increase the degree of freedom in-preparing the application.

Further, in the DMA transfer controller according to the present invention, queue control information related to the queuing transfer parameters is stored in the transfer parameter storing unit for each of the logical processors and the queue control information includes at least the valid/invalid information of the individual transfer parameters.

According to the above-described structure, since the transfer parameters can be individually deleted during the completion of the DMA transfers or the deletion of queues only by updating the queue control information, the DMA transfer request located on the way of the queues can be deleted without rewriting the transfer parameters. Further, a plurality of DMA transfer requests can be easily deleted.

Further, the DMA transfer controller according to the present invention further comprises a mechanism for holding the execution of the DMA transfers based on the transfer parameters for each of the logical processors.

According to the above-described structure, since the execution of the DMA transfers can be held for each of the logical processors, when the application is interrupted and then resumed, processes for retracting, deleting and resetting the transfer parameters during the DMA transfers are not respectively required. Thus, a holding operation and a resetting operation can be switched at high speed.

Further, the DMA transfer controller according to the present invention further comprises a mechanism for individually holding the execution of the DMA transfers based on the transfer parameters.

According to the above-described structure, since the execution of the DMA transfers can be individually held, when the application is interrupted and then resumed, processes for retracting, deleting and resetting the individual transfer parameters during the DMA transfers are not respectively required. Thus, a holding operation and a resetting operation can be switched at high speed.

Further, the DMA transfer controller according to the present invention comprises a mechanism for holding the execution of all the DMA transfers based on the transfer parameters.

According to the above-described structure, when the DMA transfers are inconveniently executed upon debugging or the like, this function can be used to skip the actual execution of the DMA transfers.

Further, in the DMA transfer controller according to the present invention, all processes related to the DMA transfers are skipped for the DMA transfers whose execution is held.

According to the above-described structure, the DMA transfer related to the logical processor whose DMA transfer request is held does not need to wait for the completion of a bus occupation time. Thus, a bus using efficiency can be improved.

Further, in the DMA transfer controller according to the present invention, queue control information related to the queuing transfer parameters is stored in the transfer parameter storing unit for each of the logical processors and the queue control information includes at least the holding information of the individual transfer parameters.

According to the above-described structure, since the holding information of the individual transfer parameters is included in the queue control information, the execution of the DMA transfers can be individually easily held and a plurality of DMA transfer requests can be easily held.

Further, the DMA transfer controller according to the present invention further comprises a mechanism for restoring the transfer parameters to values upon starting the execution of the DMA transfers when the execution of a series of DMA transfers related to the logical processors is completed, and repeating the execution of the DMA transfers based on the series of transfer parameters.

According to the above-described structure, the DMA transfers are automatically repeatedly performed for each of the logical processors, so that an overhead required for the interrupt of the completion of the DMA transfer to the start of a next DMA transfer can be eliminated and a DMA transfer efficiency can be improved in the series of the DMA transfers repeatedly performed in the application.

The DMA transfer controller according to the present invention further comprises a mechanism for restoring the transfer parameters of the DMA transfers to values upon starting the execution of the DMA transfers when the execution of the individual DMA transfers is completed, and repeating the execution of the DMA transfers based on the transfer parameters.

According to the above-described structure, the DMA transfers are automatically repeatedly performed each of the individual transfer requests, so that an overhead required for the interrupt of the completion of the DMA transfer to the start of a next DMA transfer can be eliminated and a DMA transfer efficiency can be improved for the individual DMA transfers repeatedly performed in the application.

Further, the DMA transfer controller according to the present invention further comprises a mechanism for inhibiting the interruption of the DMA transfers for each of the logical processors irrespective of the bus occupation time value or the number of transfer data capable of occupying the bus.

According to the above-described structure, when a highly emergent application is inconveniently activated so that the DMA transfer requests accompanied therewith are subjected to a time division process, the time division process of the DMA transfers can be temporarily inhibited for each of the logical processors. The highly emergent DMA transfers can be preferentially processed and then returned to an ordinary operation.

Further, the DMA transfer controller according to the present invention further comprises a mechanism for individually inhibiting the interruption of the DMA transfers irrespective of the bus occupation time value or the number of transfer data capable of occupying the bus.

According to the above-described structure, when a highly emergent application is inconveniently activated so that the DMA transfer requests accompanied therewith are subjected to a time division process, the time division process of the DMA transfers is temporarily individually inhibited. Thus, the highly emergent DMA transfers can be preferentially processed, and then, returned to an ordinary operation.

Further, in the DMA transfer controller according to the present invention, the data transfer performing unit includes a transfer parameter temporarily storing unit for holding one set of transfer parameters and the data transfer performing unit uses the transfer parameters held by the transfer parameter temporarily storing unit to perform the DMA transfer.

According to the above-described structure, since the transfer parameter storing unit does not need to be accessed during the execution of the DMA transfers, consumed power related to a memory access can be saved. Further, since the queuing of the transfer parameters from the processor does not contend with the access, a waiting time of the processor side is decreased to improve CPU efficiency.

Further, the DMA transfer controller according to the present invention includes a transfer parameter temporarily loading unit used as a buffer of one set of transfer parameters when the transfer parameters queue and the control unit uses the transfer parameters stored in the transfer parameter temporarily loading unit to form the queue control information related to the queuing transfer parameters for each of the logical processors and stores the transfer parameters and the queue control information in the transfer parameter storing unit.

According to the above-described structure, since the buffer for temporarily storing one set of transfer parameters is provided, when the transfer parameters queue, the transfer parameter storing unit does not need to be accessed every time each parameter value is stored.

Further, in the DMA transfer controller according to the present invention, when the transfer parameters queue, while the transfer parameters are transferred to the transfer parameter storing unit from the transfer parameter temporarily loading unit, the main processor waits for the access to queuing.

According to the above-described structure, the values of the transfer parameters stored in the transfer parameter temporarily loading unit can be prevented from changing to cause an unexpected operation while the transfer parameters are stored in the transfer parameter storing unit.

Further, in the DMA transfer controller according to the present invention, a queue active flag showing whether or not the transfer parameters queue is provided for each of the logical processors and the control unit cyclically checks the queue active flag to decide whether or not there is a DMA transfer request for each of the logical processors.

According to the above-described structure, after the DMA transfer related to each of the logical processors is completed, whether or not the DMA transfer request related to a next logical processor exists can be decided. When there is no DMA transfer request, the transfer parameter storing unit does not need to be accessed, a process can be performed at high speed and consumed power can be reduced.

Further, in the DMA transfer controller according to the present invention, when any of the transfer parameters related to the logical processors is validated, the queue active flag is set for each of the logical processors, and when all the DMA transfers concerning the logical processors are completed, the queue active flag is reset.

According to the above-described structure, since each queue active flag is set while all the DMA transfers are completed from the first generation of the DMA transfer request related to each of the logical processors, whether or not the DMA transfer request exists can be constantly properly shown.

Further, in the DMA transfer controller according to the present invention, when any of the queue active flags is reset, the set request of the reset queue active flag is waited.

According to the above-described structure, when the queue active flag is reset, a new set request is waited. Thus, an unexpected operation due to an improper change of the queue active flag can be prevented from occurring.

Further, in the DMA transfer controller according to the present invention, there is a path capable of directly accessing the queue active flag from outside the DMA transfer controller.

According to the above-described structure, when the processor enters a debug mode, the queue active flag can be directly externally accessed. Thus, an effective analyzing means can be provided.

In the DMA transfer controller according to the present invention, when an inconsistency is generated between the state of the queue active flag and the queue control information, the state of the queue active flag is corrected in accordance with the queue control information.

According to the above-described structure, when the inconsistency is generated between the state of the queue active flag and the queue control information by an operation under the debug mode, the state of the queue active flag is corrected in accordance with the queue control information. Accordingly, the processor can be prevented from being brought into an improper state.

According to the present invention, since the bus occupation elapse time for each of the logical processors is limited to the bus occupation time value, the scheduling of the DMA transfers in real time processes can be carried out, a system can be avoided from being broken down and the real time characteristics of the processes can be certainly assured.

Further, when the bus occupation elapse time reaches the bus occupation time value to interrupt the DMA transfer that is currently performed, since a DMA transfer to be subsequently performed is automatically started without using a program, individual programs do not need to care about the scheduling of the DMA transfers. Thus, the development or maintenance of the programs can be easily carried out.

Further, according to the present invention, the transfer parameters queue to the FIFO structure to control the DMA transfer. Thus, an overhead required for the interrupt of the completion of the DMA transfer to the start of a next DMA transfer is not necessary so that the DMA transfer efficiency can be improved.

Further, according to the present invention, since the transfer parameters can be nullified individually or for each of the logical processors, a case in which the application is invalidated halfway can be met. Further, a speculative execution of a DMA request can be performed to increase the degree of freedom in preparing the application.

Further, according to the present invention, since the execution of the DMA transfers can be held individually or for each of the logical processors, when the application is interrupted and then resumed, processes for retracting, deleting and resetting the individual transfer parameters during the DMA transfers are not respectively required. Thus, a holding operation and a resetting operation can be switched at high speed.

Further, according to the present invention, the DMA transfers are repeatedly performed for each of the logical processors or individually, so that an overhead required for the interrupt of the completion of the DMA transfer to the start of a next DMA transfer can be eliminated and a DMA transfer efficiency can be improved in the series of the DMA transfers repeatedly performed in the application.

Further, according to the present invention, when a highly emergent application is inconveniently activated so that the DMA transfer requests accompanied therewith are subjected to a time division process, the time division process of the DMA transfers can be temporarily inhibited individually or for each of the logical processors. The highly emergent DMA transfers can be preferentially processed and then returned to an ordinary operation.

BRIEF DESCRIPTION OF THE DRAWINGS

FIG. 22 is a block diagram showing a structural example having a path by which a queue active flag in the ninth embodiment of the present invention can be externally directly accessed;

FIG. 23 is a diagram showing the states of the transfer parameters in the third embodiment of the present invention; and FIG. 24 is a diagram showing the states of the transfer parameters in the third embodiment of the present invention.

Figure 1:
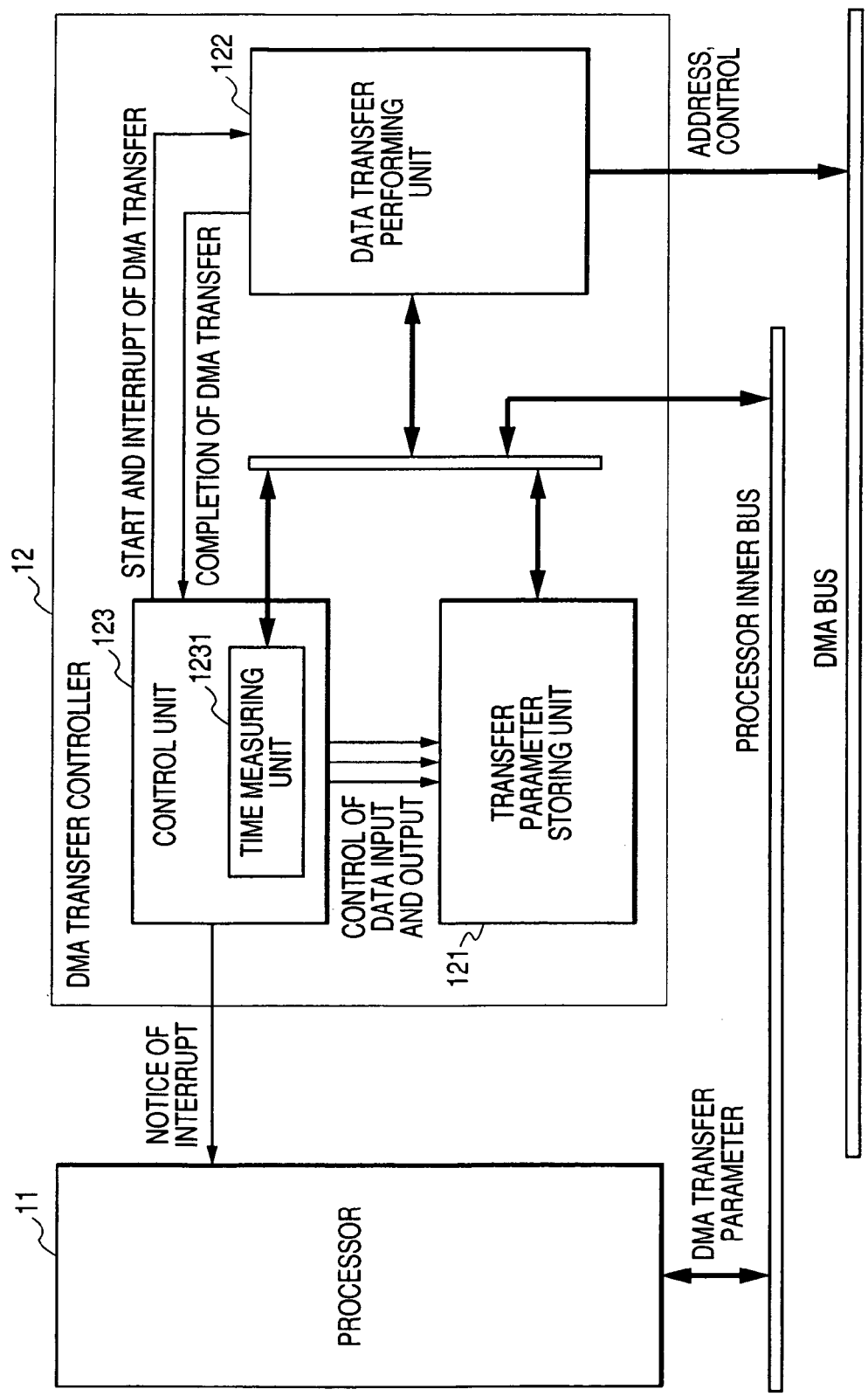
FIG. 1 is a block diagram showing the structure of a DMA transfer controller according to a first embodiment of the present invention.

In the drawings, a reference numeral 1 refers to a microprocessor unit; 2 to an external DMA controller; 3 to a peripheral circuit; 4 to an external memory; 5 to a peripheral circuit; 11 to a processor; 12, 12a, 12b, 12c, 12e to a DMA transfer controller; 13 to an external DMA bus interface; 14, 15, 16 to an inner memory; 121 to a transfer parameter storing unit; 122 to a data transfer performing unit; 123, 123a, 123b, 123c, 123e to a control unit; 124 to a transfer parameter temporarily loading unit; 125 to a memory assisting unit; 1221 to a transfer parameter temporarily storing unit; and 1231 to a time measuring unit.

DETAILED DESCRIPTION OF THE PREFERRED EMBODIMENTS

Now, embodiments of the present invention will be described by referring to the drawings. In the following description of the drawings, the same or similar parts are designated by the same or similar reference numerals and the duplicated description of the same parts is omitted.

Figure 2:
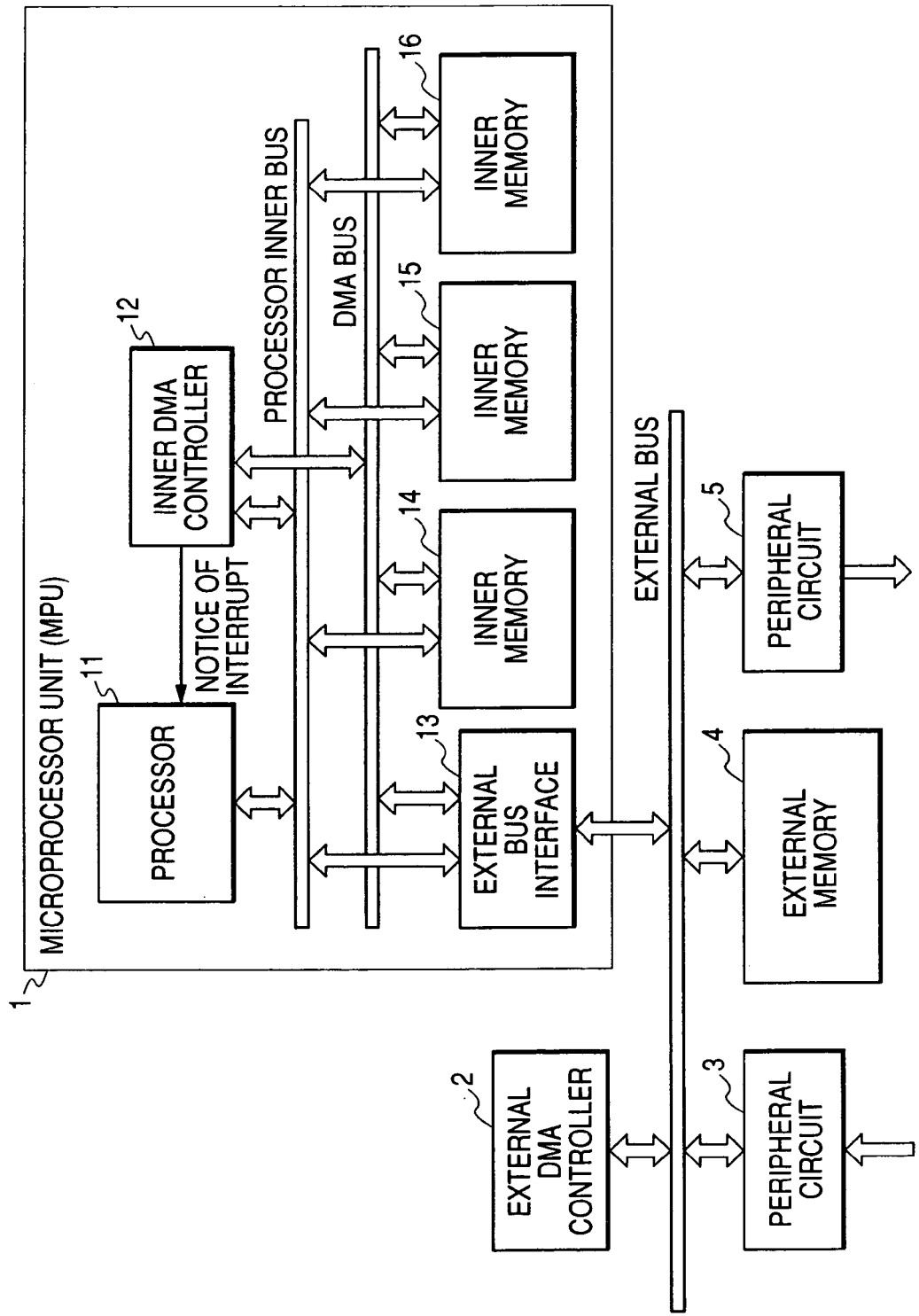
FIG. 2 is a block diagram showing a structural example of a system on which a usual DMA controller is mounted.
Figure 3:
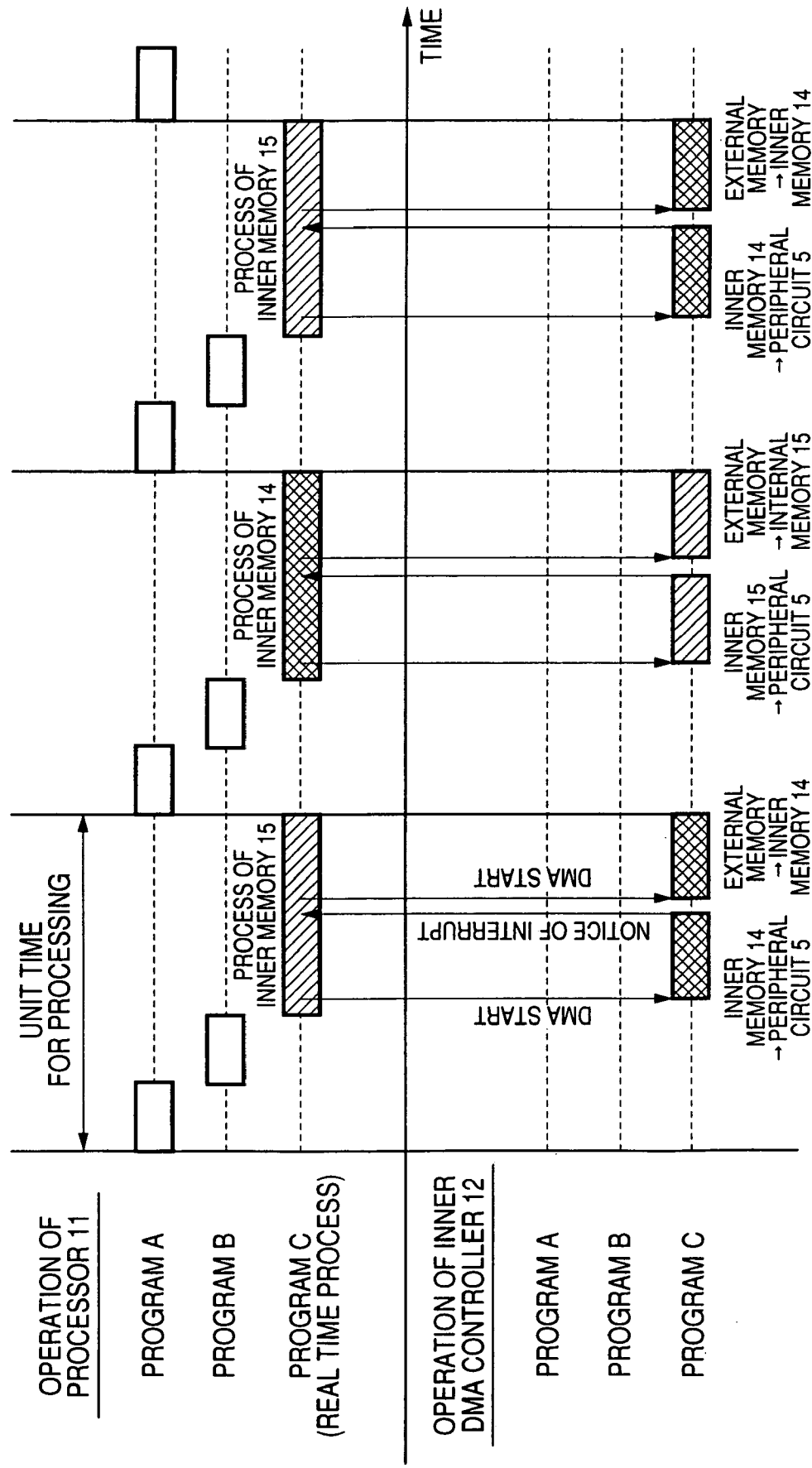
FIG. 3 is a timing chart showing an operation of the usual DMA transfer controller in a program performed under a time division.
Figure 4:
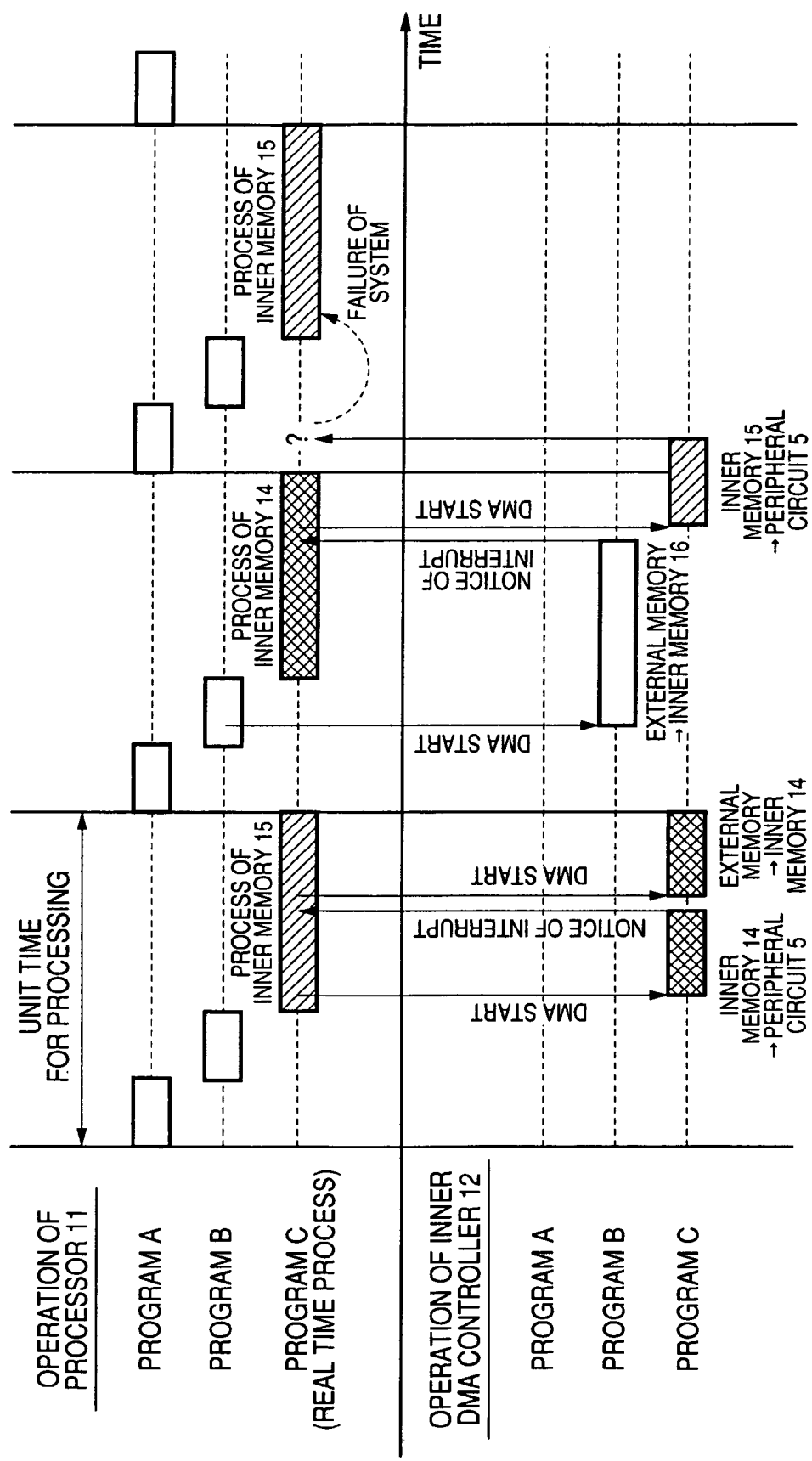
FIG. 4 is a timing chart showing an operation of the usual DMA transfer controller when a specific program occupies a DMA bus for a long time.
Figure 5:
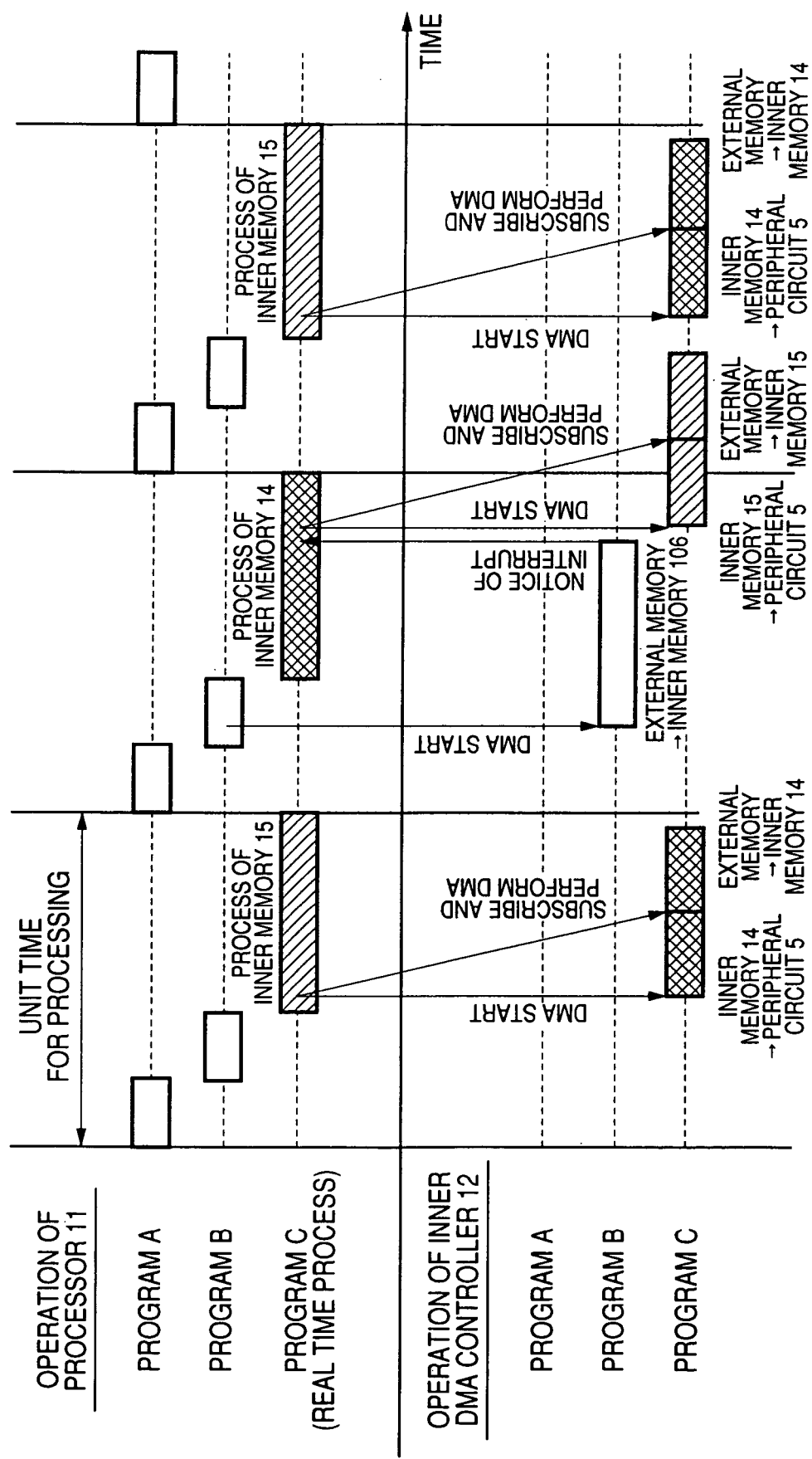
FIG. 5 is a timing chart showing an operation of the usual DMA transfer controller having a function for subscribing and performing a plurality of DMA transfers.
Figure 6:
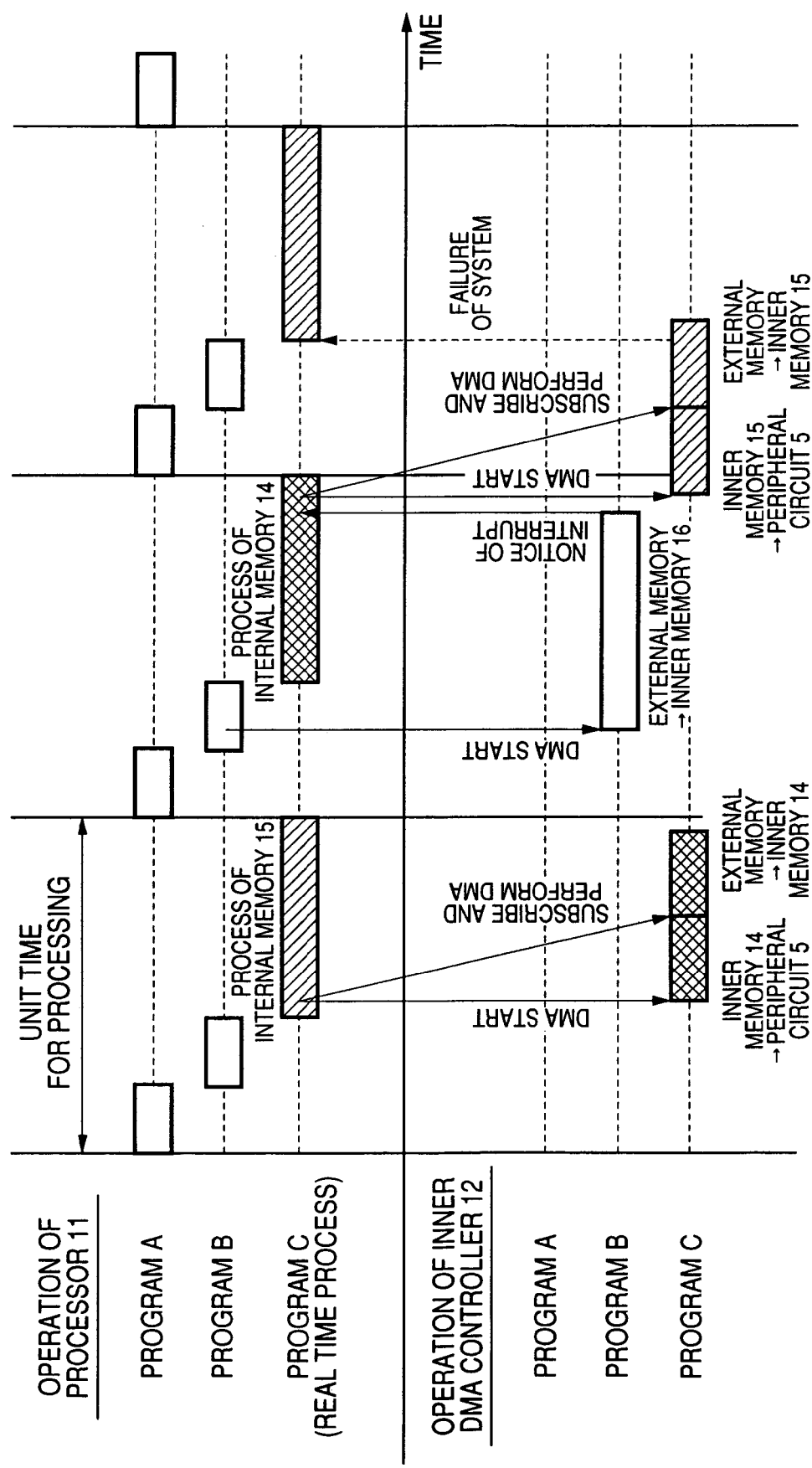
FIG. 6 is a timing chart showing an operation of the usual DMA transfer controller when a real time process is broken down even if the function for subscribing and performing the plurality of DMA transfers is provided.

In each of the embodiments of the present invention, FIG. 2 is supposed as a structure of a system. Namely, as an operational example in each of the embodiments, a case is assumed in which compressed audio data is read from a storage device (for instance, a semiconductor memory card) by using the system shown in FIG. 2, decoded and then, the decoded data is outputted to an audio interface circuit. A peripheral circuit 3 serves as an interface circuit to the semiconductor memory card and a peripheral circuit 5 serves as the audio interface circuit.

First Embodiment

FIG. 1 is a block diagram showing the structure of a DMA transfer controller according to a first embodiment. In FIG. 1, a processor 11 and a DMA transfer controller (DMA controller) 12 are connected to a processor inner bus and a DMA bus. These members are incorporated as a part of a microprocessor unit (MPU) 1 shown in FIG. 2 and designated by the same reference numerals as those of FIG. 2.

The DMA transfer controller 12 includes a transfer parameter storing unit 121, a data transfer performing unit 122 and a control unit 123. Further, the control unit 123 is formed so as to include a time measuring unit 1231. The processor inner bus, the data transfer performing unit 122 and the time measuring unit 1231 are connected to the transfer parameter storing unit 121 in the DMA transfer controller 12.

Figure 7:
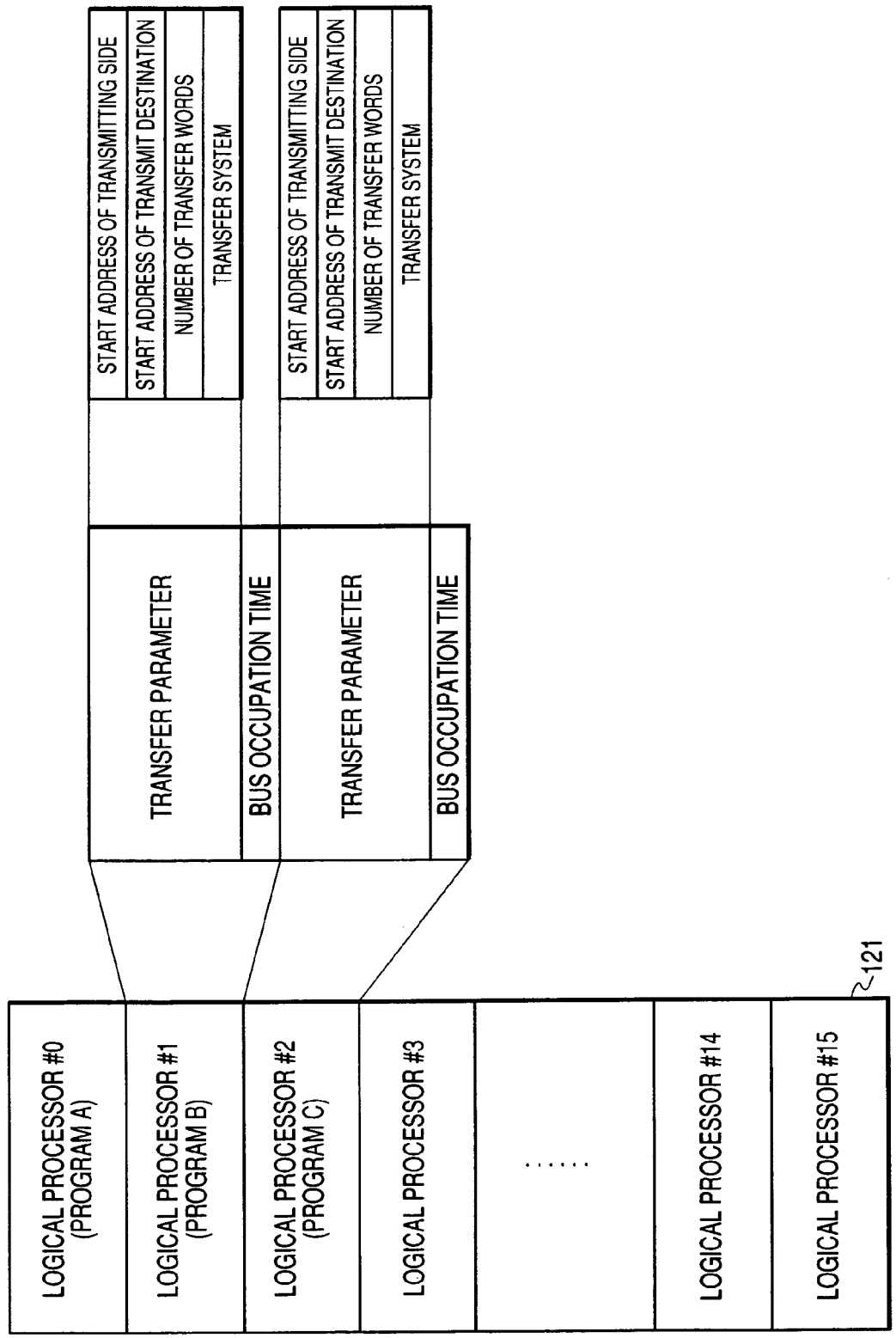
FIG. 7 is a memory map showing an example of an array of transfer parameters stored in a transfer parameter storing unit in the first embodiment of the present invention.

The transfer parameter storing unit 121 stores the transfer parameters of DMA transfers and bus occupation time transmitted from the processor 11 for each of logical processors. FIG. 7 is a memory map showing an array example of the transfer parameters stored in the transfer parameter storing unit.

The data transfer performing unit 122 forms addresses or control signals necessary for performing the DMA transfers in accordance with a control from the control unit 123. The control unit 123 controls the input and output of data stored in the transfer parameter storing unit 121 and the start and interruption of the DMA transfers carried out by the data transfer performing unit 122. Further, the DMA transfer controller according to this embodiment has a function for subscribing and performing DMA transfers as disclosed in the Patent Document 2.

Figure 8:
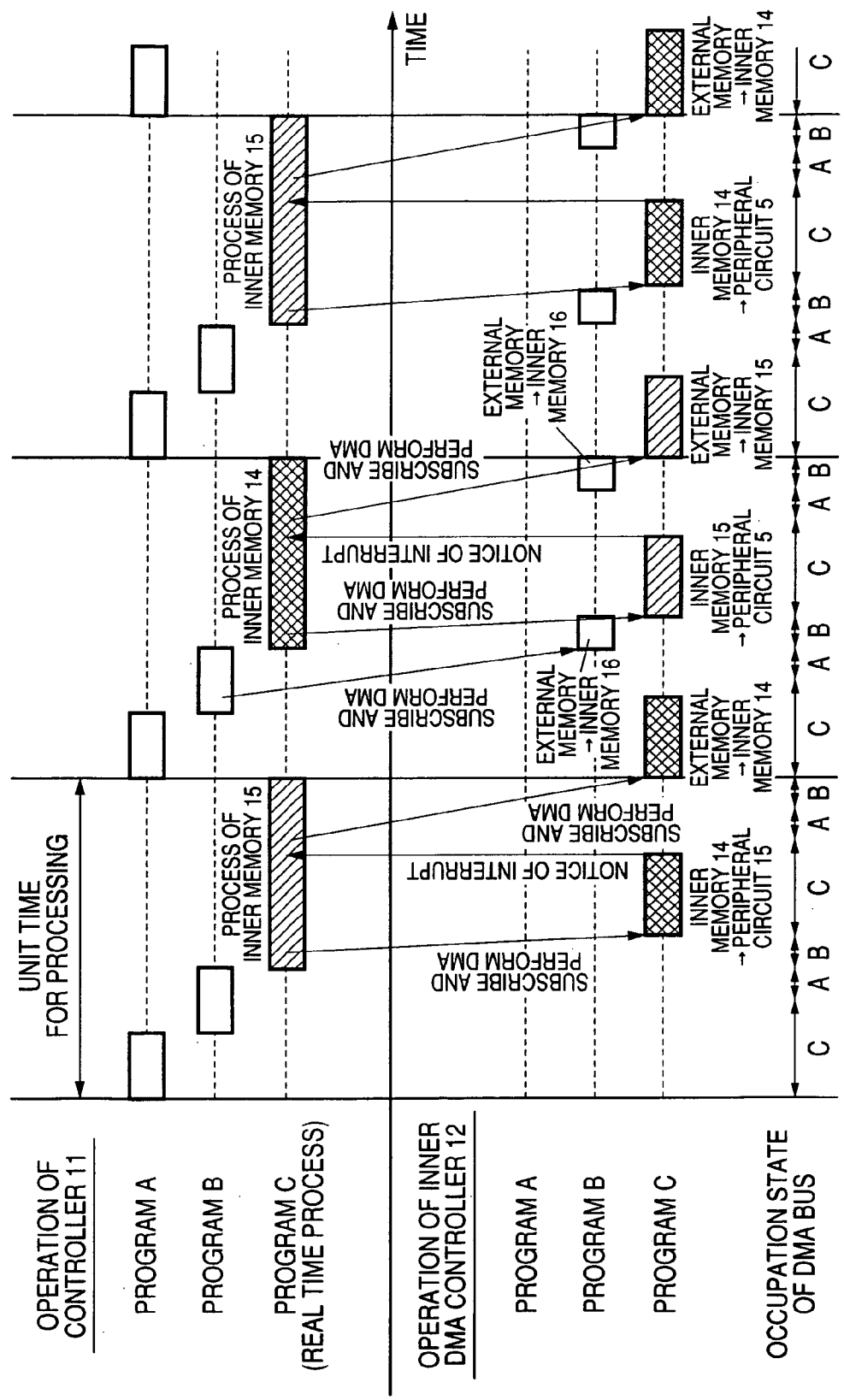
FIG. 8 is a timing chart showing an operational example of the DMA transfer controller according to the first embodiment of the present invention.

FIG. 8 is a timing chart showing an operational example of the DMA transfer controller according to this embodiment. In this example, three different programs A, B and C are respectively allocated to logical processors 0, 1 and 2. The DMA bus occupation time of the programs are respectively determined so as to have a relation of A:B:C=1:1:3. The values of the bus occupation time are stored in the transfer parameter storing unit 121 by the processor 11 as shown in FIG. 7.

The bus occupation time of the logical processors 3 to 15 to which programs are not allocated is 0. The time measuring unit 1231 cyclically reads the bus occupation time in order of the numbers of the logical processors to constantly measure bus occupation elapse time for each of the logical processors. The occupation rights of the DMA bus are respectively allocated to the programs as shown in the lowermost stage of FIG. 8.

Firstly, the program C requests the DMA transfer controller 12 to perform the DMA transfers from an inner memory 14 to the peripheral circuit 5. At this time, the processor 11 transmits one set of transfer parameters necessary for performing the DMA transfers to the DMA transfer controller 12 and these transfer parameters are stored in the transfer parameter storing unit 121. The one set of transfer parameters includes such items as described below.

(1) Start address of a transmitting side (an inner memory 14)
(2) Start address of a transmit destination (a peripheral circuit 5)
(3) Transfer system
(4) The number of transfer words When the allocation of the DMA bus is switched to the program C, the control unit 123 reads that the number of transfer words is not 0 to allow the data transfer performing unit 122 to start the DMA transfer. As the DMA transfer advances, the data transfer performing unit 122 updates the address of the transmitting side, the address of the transmit destination and the number of transfer words stored in the transfer parameter storing unit 121 at any time. When the number of the transfer words is equal to 0, the data transfer performing unit informs the control unit 123 of the completion of the DMA transfer. Further, the control unit 123 informs the processor 11 of an interrupt.

The program C receives the information of the interrupt, and then, requests for a DMA transfer as a next DMA transfer from an external memory to the inner memory 14. The procedure of the request is the same as that of a first DMA transfer. When the DMA bus is allocated again to the program C, the DMA transfer is performed.

Further, as time proceeds, the program B requests for the DMA transfer and the DMA transfer is performed. However, since the bus occupation time of the program B is relatively short, the DMA transfer is not completed at a time. When the bus occupation elapse time of the DMA transfer reaches the bus occupation time, the control unit 123 controls the data transfer performing unit 122 to interrupt the DMA transfer. At this time, since the intermediate progress of the address of the transmitting side, the address of the transmit destination and the number of the transfer words remain in the transfer parameter storing unit 121, when the DMA bus is allocated again to the program B, the DMA transfer can be continuously performed.

Here, in the timing chart shown in FIG. 8, as shown in the lowermost stage of the figure, the bus occupation time is forcedly given as a time slot for performing the DMA transfer for each of the logical processors. However, in this method, when all the DMA transfers related to a certain logical processor are completed before the bus occupation elapse time reaches a bus occupation time value, space time is generated in the given time slot for the DMA transfer. Therefore, in the system for mechanically giving the time slot for the DMA transfer to each of the logical processors, the maximum operation rate of the DMA bus cannot be obtained. Thus, an achievable real time performance may be possibly lowered.

Thus, according to the present invention, when all the DMA transfers related a certain logical processor are completed before the bus occupation elapse time reaches the bus occupation time value, a DMA transfer related to a next logical processor is controlled to immediately start. The sequence of the logical processors are in order of numbers and cyclic. Further, all DMA transfer processes related to the logical processor in which the DMA transfer parameters are not stored are controlled to skip. In such a way, the operation rate of the DMA bus can be raised to a limit.

When the DMA transfers of the program B are interrupted or completed in accordance with the control functions, if it is recognized that the transfer parameters of the program C are stored in the transfer parameter storing unit 121, the control unit 123 controls the data transfer performing unit 122 to start the DMA transfers of the program C.

Figure 9:
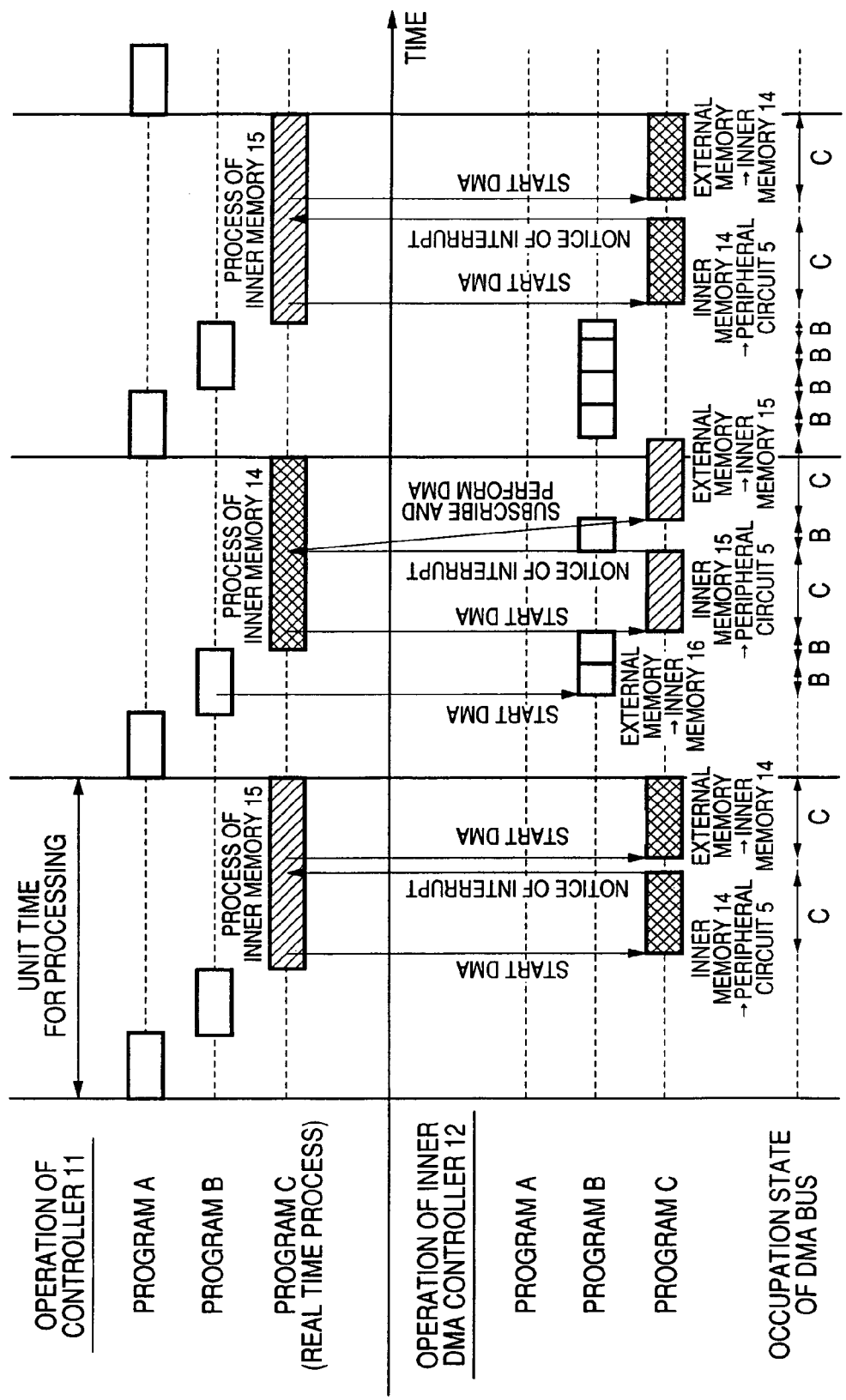
FIG. 9 is a timing chart showing an operational example in which the DMA transfers are repeatedly interrupted and resumed in the DMA transfer controller according to the first embodiment of the present invention.

However, when the DMA transfers of the program. B are interrupted, if the transfer parameters of the program C are not yet stored in the transfer parameter storing unit, the control unit 123 controls to start the DMA transfer on the basis of a next transfer parameter. However, the control unit controls again to start the DMA transfers of the program B, because other transfer parameters are not set. FIG. 9 is a timing chart showing an operational example in which the DMA transfers in this case are repeatedly interrupted and resumed.

As described above, the control unit 123 cyclically checks the transfer parameters subscribed and stored in the transfer parameter storing unit 121. Then, the control unit controls the data transfer performing unit 122 to start a next DMA transfer in which the number of the transfer words is not 0. Accordingly, when the bus occupation elapse time reaches the bus occupation time to interrupt the DMA transfers, a next DMA transfer can be immediately started without using the program.

Further, in the DMA transfer controller according to this embodiment, as a time monitor method equivalent to a method for measuring the bus occupation elapse time by using the time measuring unit 1231, a method for measuring the number of bus transfer data may be employed. In this case, the number of transfer data capable of occupying the bus is stored in the transfer parameter storing unit 121 in place of the bus occupation time value. The time measuring unit 1231 measures the number of the bus transfer data in the DMA transfers. When the number of the bus transfer data reaches the number of transfer data capable of occupying the bus, a DMA transfer that is currently performed is interrupted to start a next DMA transfer.

In the above description, in the transfer parameters subscribed and stored in the transfer parameter storing unit 121, the number of the transfer words is checked to decide whether or not there is an actual DMA transfer request. However, in place of the above-described method, a part of the transfer parameters, for instance a DMA transfer request valid flag may be provided in the transfer system. This may be applied to other embodiments as described below.

As described above, in the DMA transfer controller according to this embodiment, DMA occupation time or the number of transfer data capable of occupying the bus equivalent thereto is allocated to each program and controlled, so that a scheduling is simultaneously carried out. Thus, in the individual programs (A, B, C), the scheduling of the DMA transfers does not need to be considered. Further, a sufficient bus occupation time is allocated to the program (C) that requires a real time process, so that the failure of the system in the real time process can be avoided.

Second Embodiment

In the above-described first embodiment, the DMA transfer controller can cyclically start the DMA transfers on the basis of the transfer parameters subscribed and stored in the transfer parameter storing unit without using a program. However, the transfer parameters in which the DMA transfers are completed and the number of the transfer words is equal to 0 lose their effects. Thus, new transfer parameters need to be received by interrupting the processor.

For instance, in the timing chart shown in FIG. 8, after the DMA transfer is completed from an inner memory 15 to the peripheral circuit 5, the processor needs to be interrupted to subscribe a DMA transfer request from an external memory to the inner memory 15. In this embodiment, in the DMA transfer controller shown in FIG. 1, one logical processor subscribes a plurality of DMA transfer requests. Thus, a series of DMA transfers related thereto can be performed without interrupting the processor.

Figure 10:
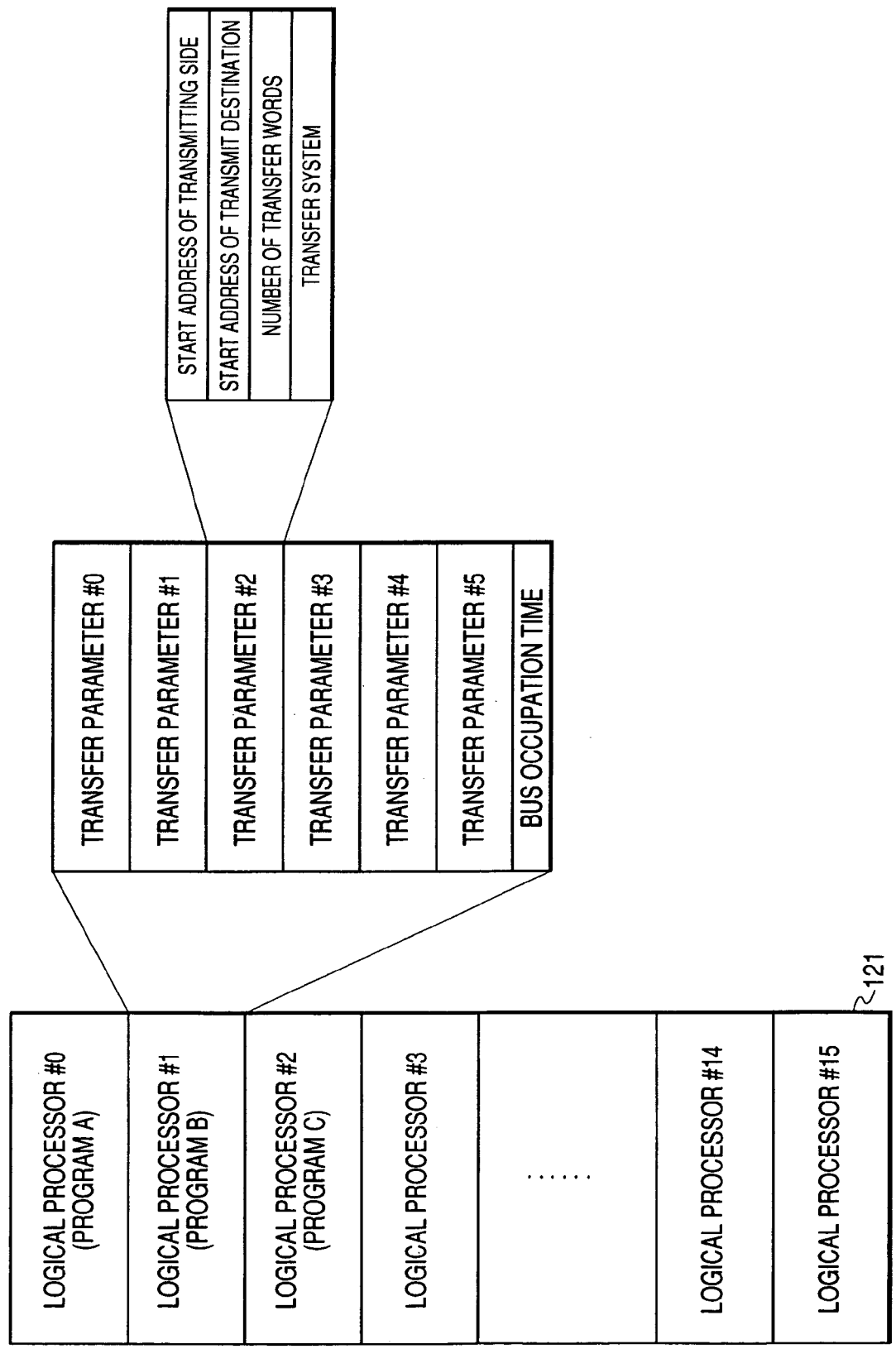
FIG. 10 is a memory map showing an example of an array of transfer parameters stored in a transfer parameter storing unit in a second embodiment of the present invention.

FIG. 10 is a memory map showing an example of an array of transfer parameters stored in a transfer parameter storing unit in a DMA transfer controller according to a second embodiment of the present invention. In this example, six sets of transfer parameters can queue to one logical processor 1. Since a DMA transfer based on the queue of the transfer parameters is continuously performed as a series of DMA transfers, one bus occupation time is given to the six sets of transfer parameters.

The queue of the transfer parameters has an FIFO structure. For instance, a control unit 123 has pointers of a queue top and a queue bottom for each of the logical processors and controls to update the queue top upon loading the transfer parameter and to update the queue bottom upon completion of the DMA transfer.

Figure 11:
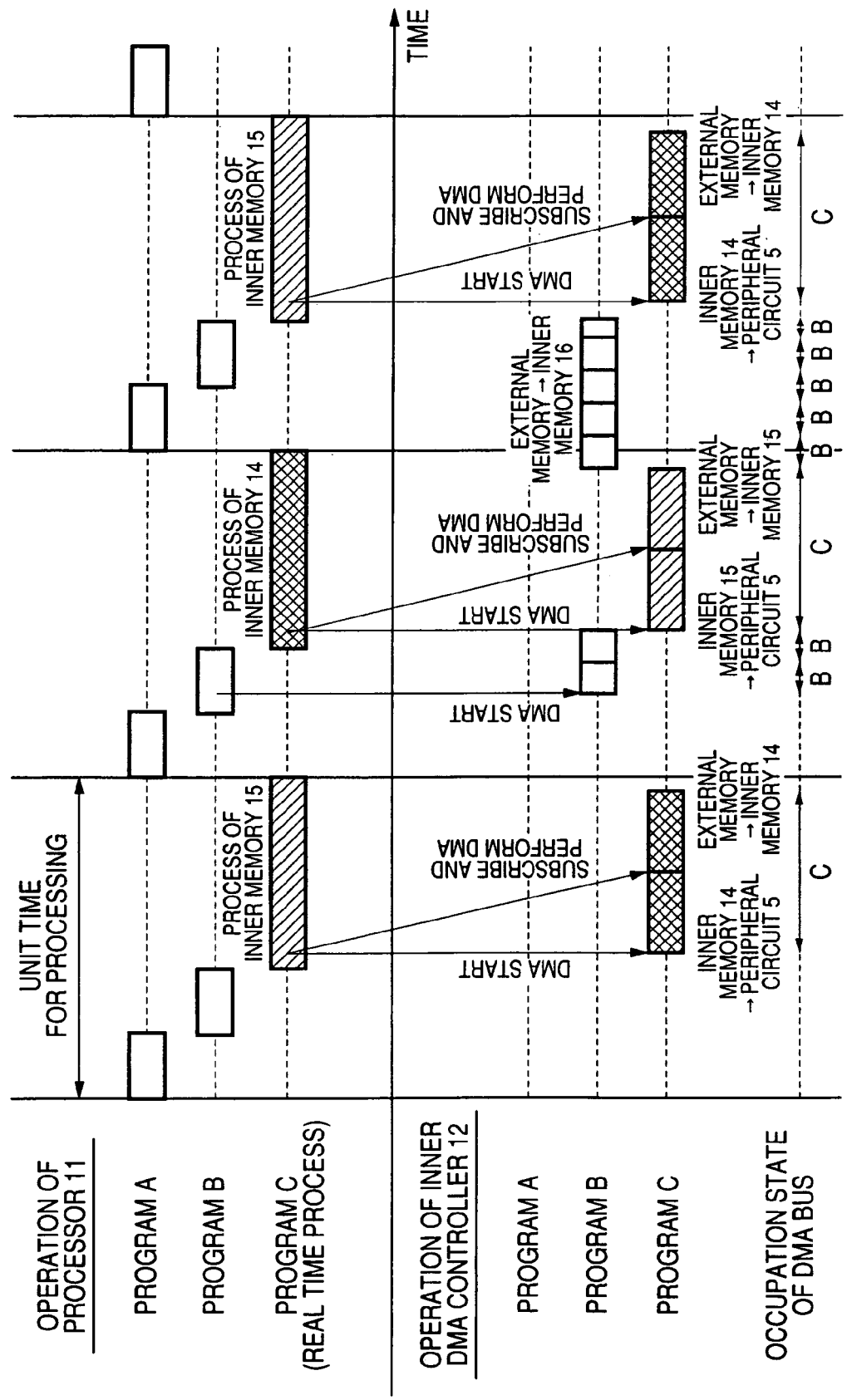
FIG. 11 is a timing chart showing an operational example of the DMA transfer controller according to the second embodiment of the present invention.

FIG. 11 is a timing chart showing an operational example of the DMA transfer controller according to this embodiment. In this example, in the system of a structural example shown in FIG. 2, the three different programs A, B and C are respectively allocated to the logical processors 0, 1 and 2 and the transfer parameters thereof are respectively stored in the transfer parameter storing unit 121.

The program A does not perform the DMA transfer. A relatively short bus occupation time is given to the program B. In the program C that requires real time characteristics, two sets of transfer parameters are set to the logical processor 2 so that the DMA transfers to the peripheral circuit 5 from inner memories 14 and 15 and the DMA transfers from the external memory to the inner memories 14 and 15 can be continuously performed and a bus occupation time necessary for the two DMA transfers is given.

The transfer parameters of the logical processor 2 queue in such a way. Thus, an overhead required for the interrupt of the completion of the DMA transfers and the start of the DMA transfers is eliminated between the DMA transfers from the inner memories 14 and 15 to the peripheral circuit 5 and the DMA transfers from the external memory to the inner memories 14 and 15. Accordingly, DMA transfer efficiency can be improved.

The above-described program C requires the real time characteristics. However, an instantaneous responsiveness to the occurrence of a phenomenon may be required depending on an application. In this case, the DMA transfer of transfer parameters prepared so as to meet the occurring phenomenon needs to be most preferentially performed. Therefore, a mechanism in which the transfer parameter having a priority higher than that of the queue of ordinary transfer parameters can queue as an emergent queue of the logical processor needs to be provided.

Figure 12:
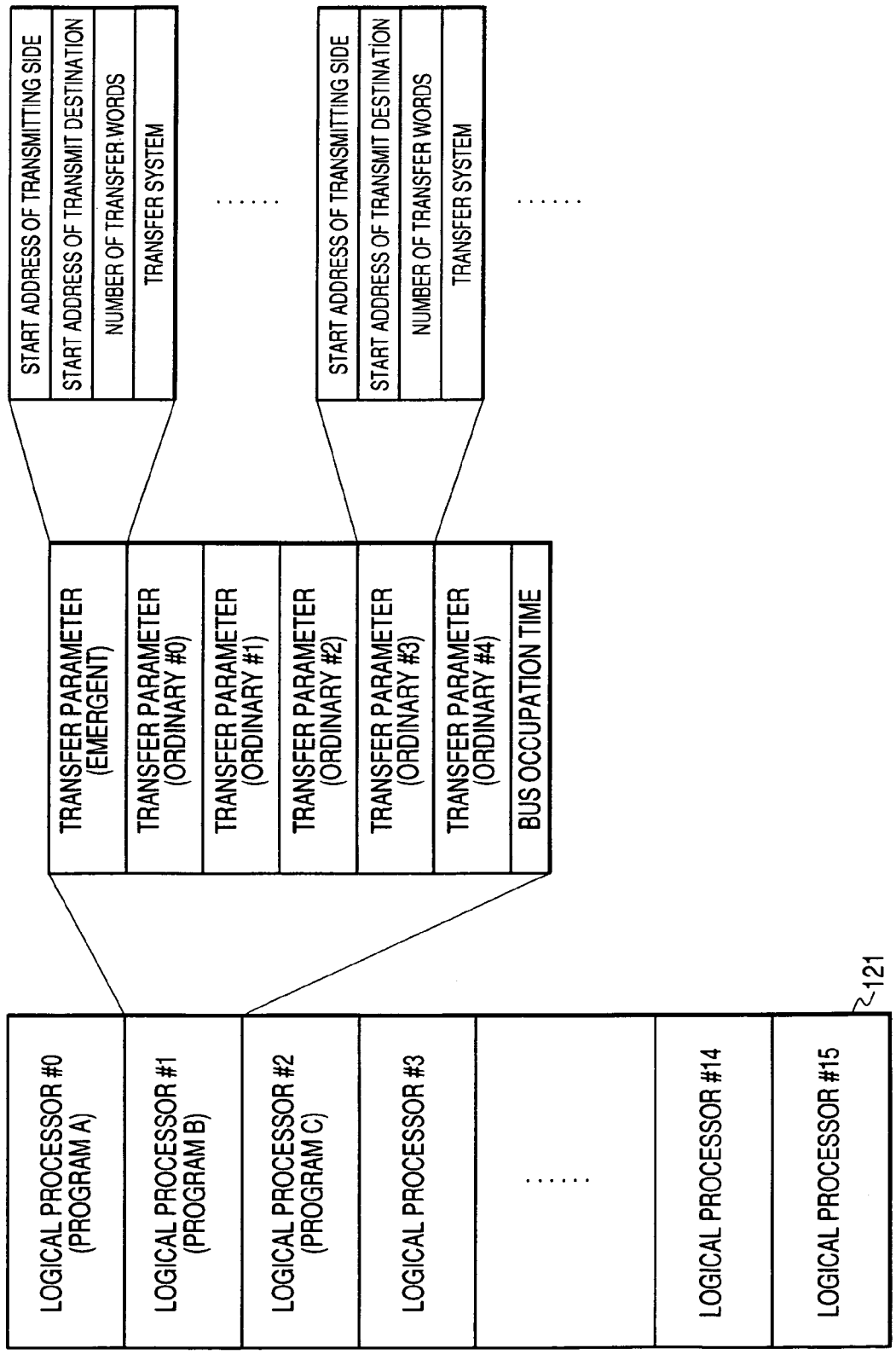
FIG. 12 is a memory map showing an example of an array of transfer parameters in which an emergent queue can queue in the second embodiment of the present invention.

FIG. 12 is a memory map showing an example of an array of the transfer parameters by which the above-described emergent queue can queue. In FIG. 12, the transfer parameter of the emergent queue can queue before the first transfer parameter of the ordinary queue of the logical processor. In such a way, the queuing mechanism of the emergent queue is provided, so that the DMA transfer corresponding to the occurring phenomenon can be most preferentially performed.

On the other hand, when the queuing of the transfer parameters according to this embodiment is unlimitedly performed, there is a possibility that the number of the transfer parameters exceeds the maximum number of transfer parameters. When it is detected that the queuing of the transfer parameters is to be carried out by exceeding the maximum number of transfer parameters, the processor is informed of it as an error. Further, while the emergent queue queues, when an emergent queue is to queue, this is detected to inform the processor of it as an error.

Figure 13:
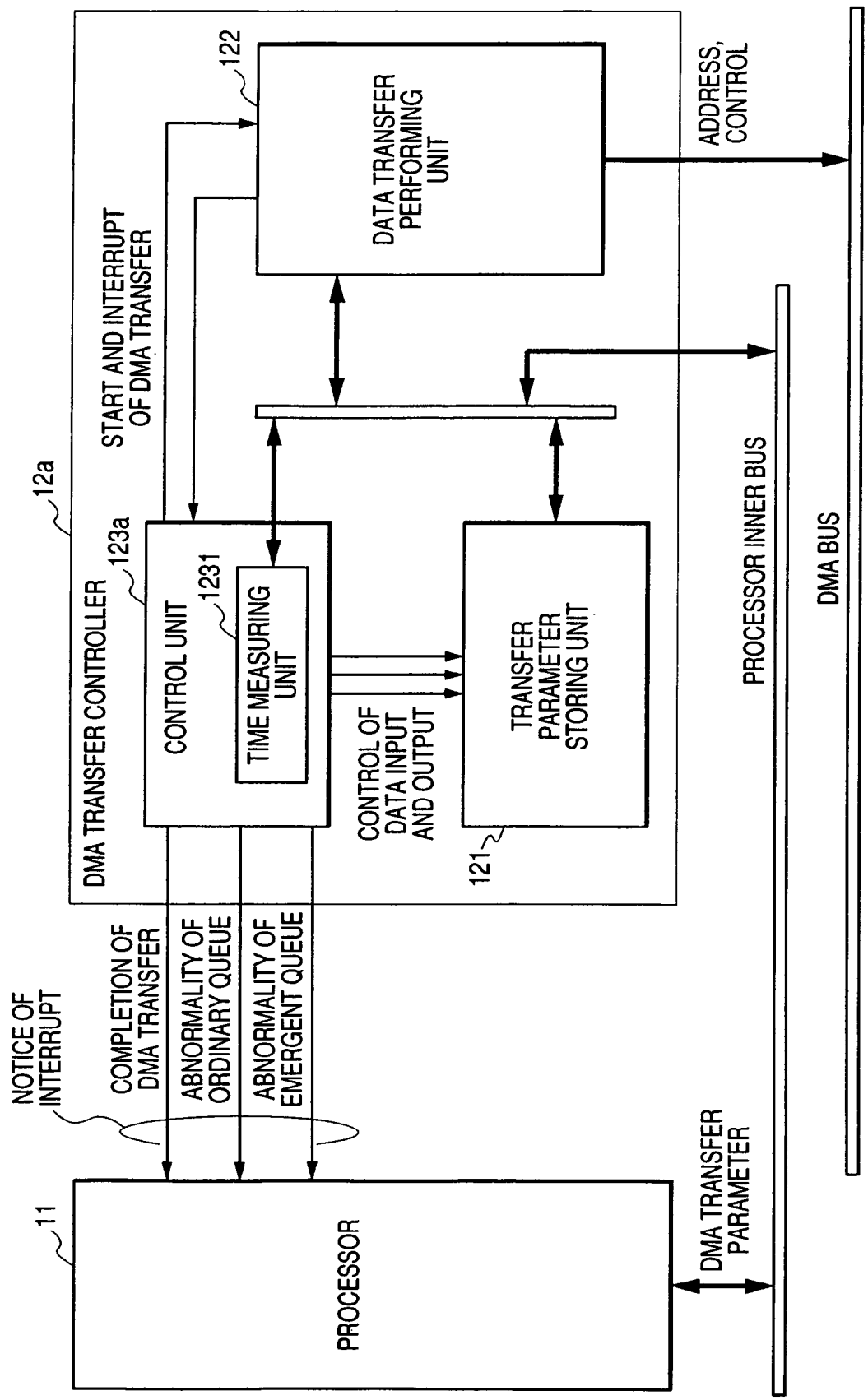
FIG. 13 is a block diagram showing the structure of the DMA transfer controller according to the second embodiment of the present invention.

FIG. 13 is a block diagram showing the structure of the DMA transfer controller according to the second embodiment of the present invention and has a function for detecting an abnormality in queuing of the transfer parameters as described above and informing the processor of it by an interrupt.

In the DMA transfer controller 12a shown in FIG. 13, as the interrupt to a processor 11, the above-described information of the abnormality of an ordinary queue and the information of the abnormality of the emergent queue are added and a control function related thereto is added to a control unit 123a. These functions are provided to prevent an unexpected operation such as the damage of already queuing transfer parameters.

Third Embodiment

In this embodiment, a DMA transfer request can be deleted. Thus, a case in which an application is invalidated halfway or a case in which the number of transfer parameters is changed halfway can be met. Further, a speculative execution of a DMA request can be performed to increase a degree of freedom in preparing the application. Now, this embodiment will be described by referring to the DMA transfer controller shown in FIG. 1 or FIG. 13.

When the application is invalidated halfway, a method for deleting the DMA transfer request for each of logical processors may be employed. In this case, a processor rewrites to invalidate transfer parameters corresponding to the relevant logical processor. This can be achieved by setting the number of transfer words to 0 or setting a valid flag to invalidity when the valid flag is provided.

Further, when a plurality of DMA transfer requests queuing to one logical processor as in the second embodiment are completely deleted, this can be achieved by returning the pointers of the queue top and the queue bottom of the relevant processor to initial states in the control unit 123a. However, when all of the plurality of the DMA transfer requests are not deleted and individually deleted, a process for maintaining a queue structure is necessary.

Figure 14:
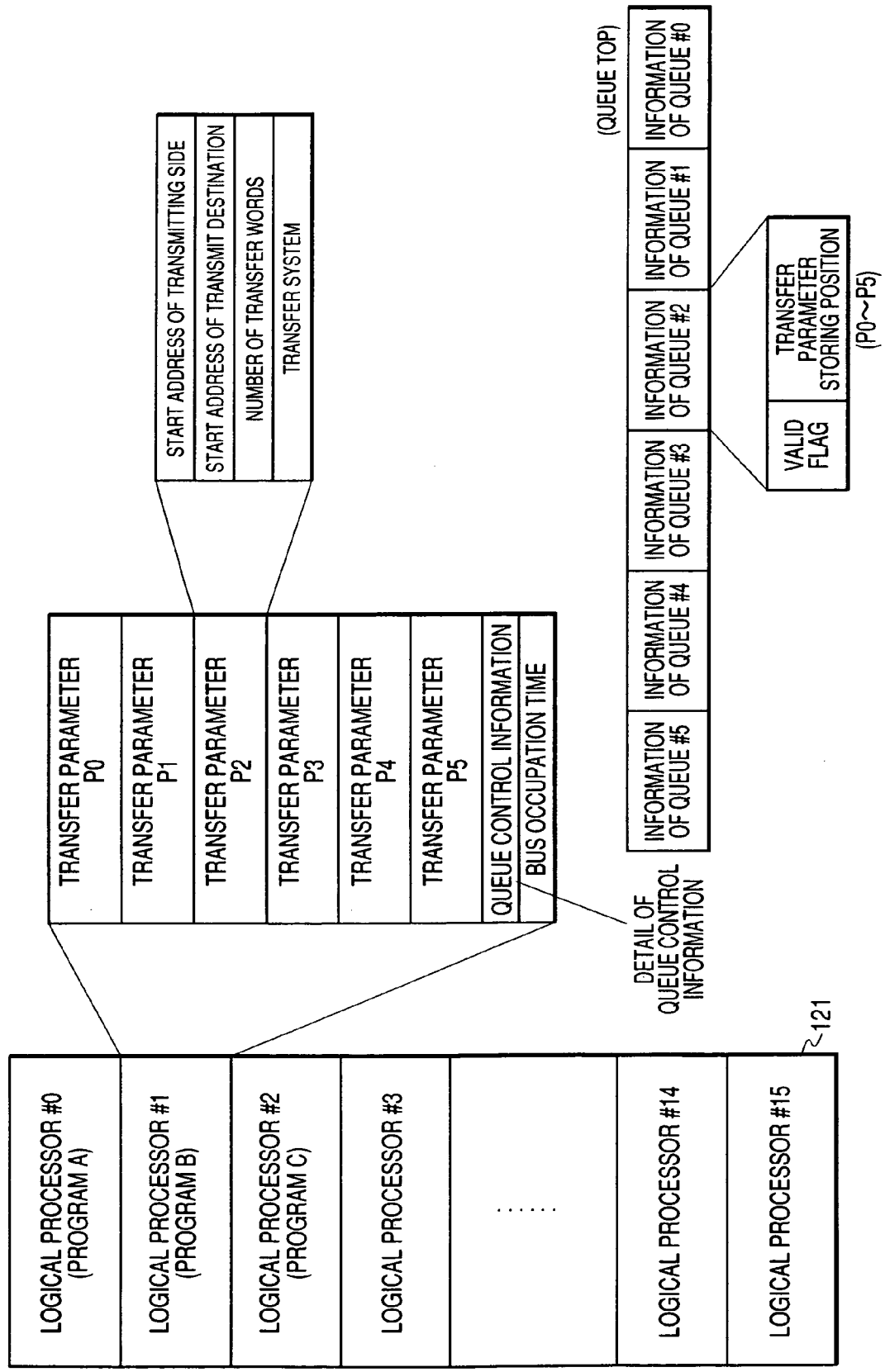
FIG. 14 is a memory map showing an example of an array of transfer parameters stored in a transfer parameter storing unit in a third embodiment of the present invention.

FIG. 14 is a memory map showing an example of an array of the transfer parameters stored in a transfer parameter storing unit in the DMA transfer controller according to the third embodiment of the present invention. In this example, six sets of transfer parameters can queue to one logical processor 1. Bus occupation time and queue control information are given to all the six sets of the transfer parameters.

The queue control information includes a storing position of each transfer parameter arranged in a queue and a valid flag showing its validity. The queue structure is controlled by the queue control information. The queue control information is divided into six parts. A part located at a right end serves as the queue top. The storing positions of the transfer parameters are designated by sequential numbers in a queue area. The transfer parameters can be stored in arbitrary positions. The storing positions are determined when the transfer parameters are registered and the valid flag is updated to validity upon loading for validating the transfer parameters.

When the DMA transfers are completed and when the DMA transfer requests are individually deleted, relevant queue information is removed from the queue control information and queue information nearer to the bottom side than the relevant queue is shifted to come near to the queue top side. Thus, one space is formed in the storing positions of the transfer parameters. A new transfer parameter can individually queue to this storing position from the processor. That is, the new transfer parameter can be registered to update (load) the valid flag of the queue control information to validity.

Examples of the queue control information and the states of the transfer parameters in the queue area upon DMA transfer and upon completion of the DMA transfers are shown in FIG. 23. Further, examples of the queue control information and the states of the transfer parameters in the queue area before and after deletion when the DMA transfer requests are individually deleted are shown in FIG. 24.

As described above, the queue control information for respectively controlling the transfer parameters is provided. Thus, the queue control information is merely updated, so that the transfer parameters can be individually invalidated upon completion of the DMA transfers or upon deletion of the queue. As a result, the DMA transfer request located on the way of the queue can be deleted without rewriting the transfer parameter itself. Further, a plurality of DMA transfer requests can be easily deleted.

Figure 15:
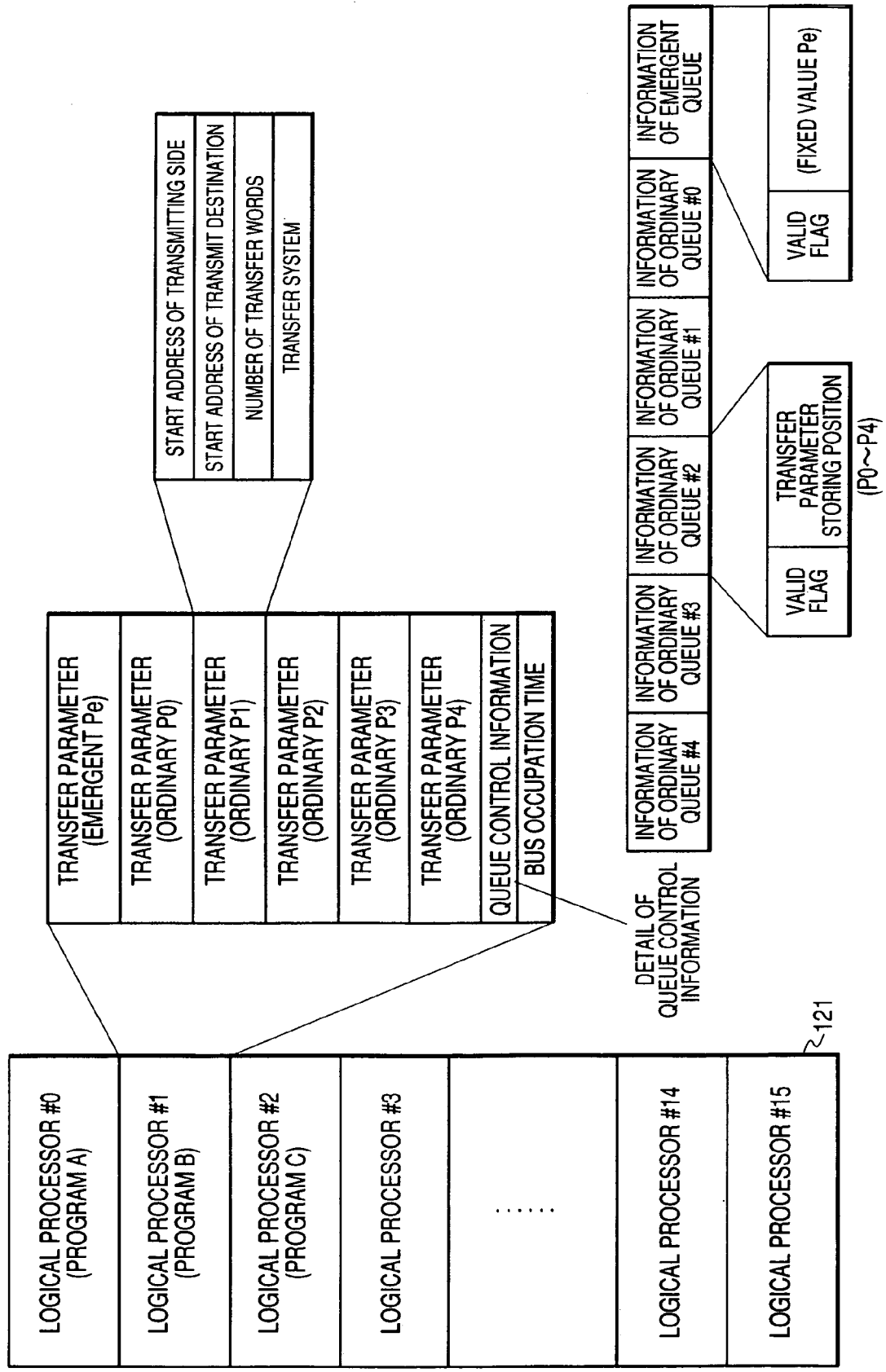
FIG. 15 is a memory map showing an example of an array of transfer parameters when emergent queues queue in the third embodiment of the present invention.

FIG. 15 is a memory map showing an example of an array when an emergent queue queues to the transfer parameters stored in a transfer parameter storing unit 121 in this embodiment. In this case, the queue control information likewise includes the control information of the emergent queues. Thus, the same processes as those of the above-described method can be carried out.

Fourth Embodiment

In this embodiment, the DMA transfer request can be held. Accordingly, when an application is interrupted and then resumed, processes for retracting, deleting and resetting the transfer parameters during the DMA transfers are not respectively required. Thus, a holding operation and a resetting operation can be switched at high speed. Now, this embodiment will be described below by referring to the DMA transfer controller shown in FIG. 1 or FIG. 13.

When the application is interrupted halfway, a method for holding the DMA transfer request for each of the logical processors is employed. In this case, the processor sets holding information for each of the logical processors to the control unit 123 from the processor. The control unit 123 controls not to perform the DMA transfer request corresponding to the logical processor to which the holding information is set.

Figure 16:
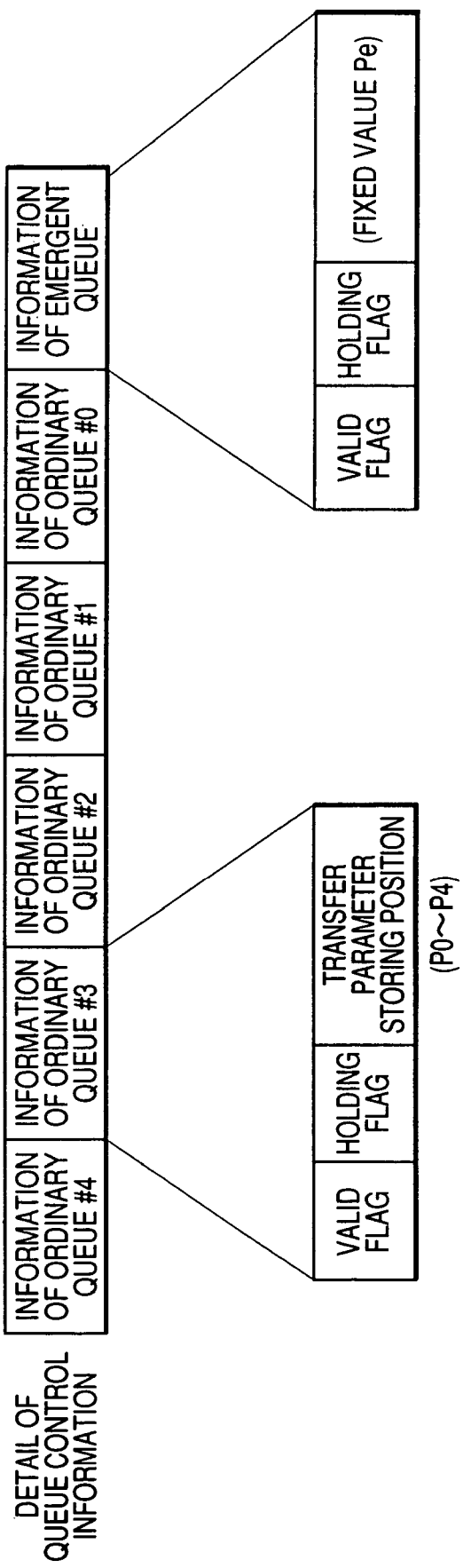
FIG. 16 is a diagram showing a structural example of queue control information having holding flags for each of DMA transfer requests in a fourth embodiment of the present invention.

When the plurality of the DMA transfer requests queuing to one logical processor as in the second embodiment are individually held, a method for providing a holding flag for each of the DMA transfer requests in the queue control information is employed. FIG. 16 is a diagram showing a structural example of the queue control information when a holding flag is provided for each of the DMA transfer requests in the queue control information.

When the DMA transfer request is held for each of the logical processors, or when all the DMA transfer requests of the logical processors are held, a DMA bus occupation is skipped without depending on bus occupation time given to the relevant processor. Thus, the completion of the bus occupation time of the DMA transfer related to the logical processor for which the DMA transfer request is held does not need to be waited for so that a bus using efficiency can be improved.

Further, a function for holding the execution of all the queuing DMA transfer requests can be provided. The processor controls the control unit 123 to perform a completely holding command to shift the DMA transfer requests to a completely holding state, and to perform a canceling command to evade the DMA transfer requests from the completely holding state. When the DMA transfers are inconveniently performed upon debugging or the like, this function can be employed to hold the execution of all the DMA transfers.

Fifth Embodiment

In this embodiment, a function for repeatedly performing specific DMA transfers is realized. Thus, an overhead required for the interrupt of the completion of the DMA transfer to the start of a next DMA transfer can be eliminated and a DMA transfer efficiency can be improved for the DMA transfers repeatedly performed in the application. Now, this embodiment will be described below by referring to the DMA transfer controller shown in FIG. 1 or FIG. 13.

To realize this function, the transfer parameter storing unit 121 holds the set values of the queuing transfer parameters when the transfer parameters are registered for the repeatedly performed DMA transfers. The control unit 123 controls the transfer parameters to be repeatedly restored (queuing).

Figure 17:
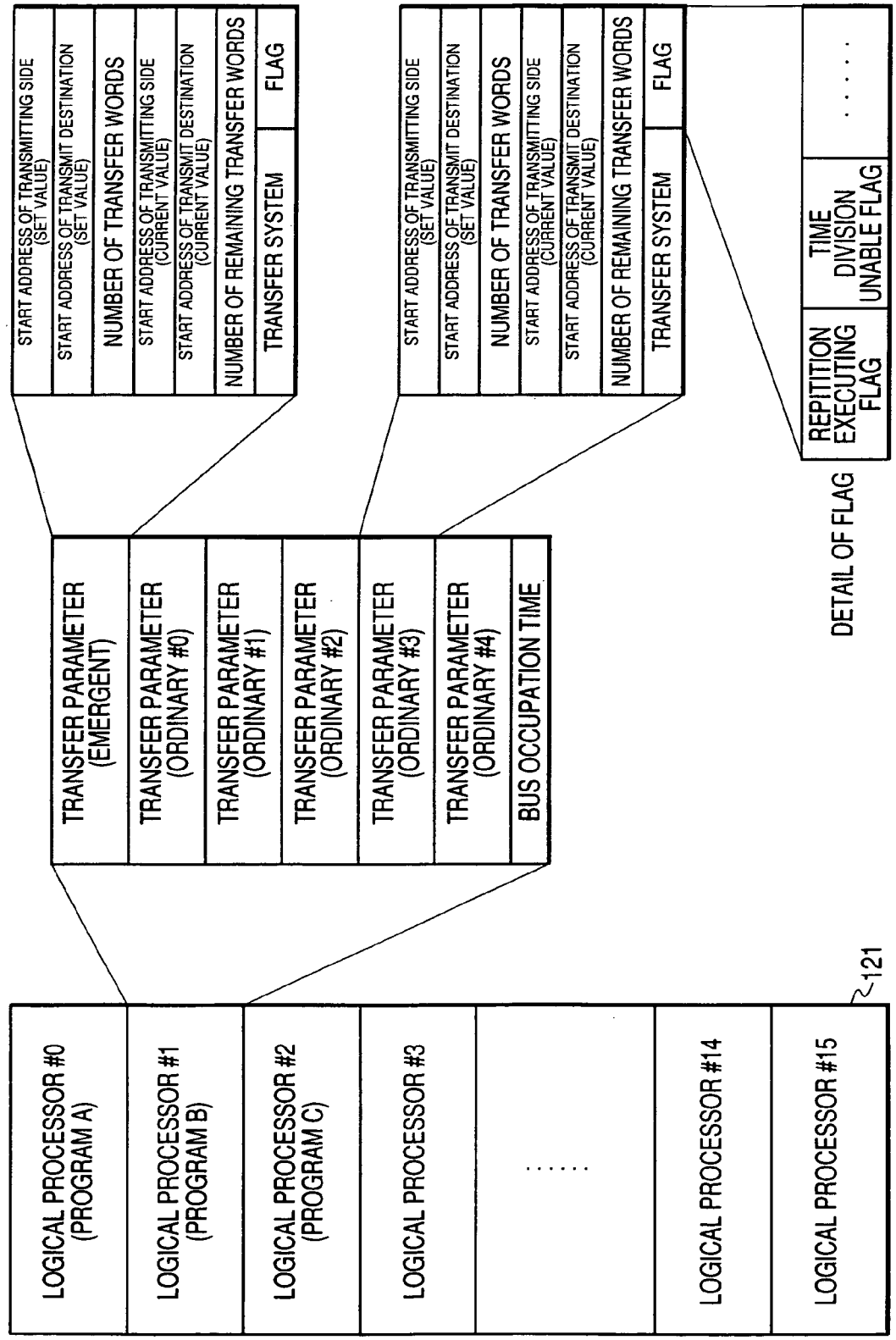
FIG. 17 is a memory map showing an example of an array of transfer parameters stored in a transfer parameter storing unit in a fifth embodiment of the present invention.

FIG. 17 is a memory map showing an example of an array of the transfer parameters stored in the transfer parameter storing unit in the DMA transfer controller according to the fifth embodiment of the present invention. In this embodiment, six sets of transfer parameters can queue to one logical processor 1 like the second embodiment. Bus occupation time is given to all the six sets of the transfer parameters.

Further, in each of the transfer parameters, not only the current values of the start address of a transmitting side, the start address of a transmit destination, and the number of transfer words which are updated at any time during the execution of the DMA transfers, but also the set values of the transfer parameters when they are registered for restoring the transfer parameters to initial values are held. Further, as a control flag, a repetitive execution flag is provided.

When the DMA transfers are repeatedly performed for each of the logical processors, after the DMA transfers composed of a series of set transfer parameters are finished, the series of transfer parameters are restored again to the initial values. Further, the DMA transfer requests are individually repeatedly performed, after the DMA transfers of the transfer parameters to which the repetitive execution flag is set are completed, the transfer parameters are restored to the initial values to start the DMA transfers again.

As described above, the DMA transfers are automatically repeatedly performed for each of the logical processors or each of the individual DMA transfer requests, so that an overhead required from the interrupt of the completion of the DMA transfer to the start of a next DMA transfer can be eliminated and a DMA transfer efficiency can be improved.

Sixth Embodiment

In this embodiment, a mechanism by which the time division process of the DMA transfers can be temporarily inhibited is realized. Thus, when a highly emergent application is activated to perform the DMA transfer requests, the time division process of the DMA transfers can be temporarily inhibited. The highly emergent DMA transfers can be preferentially processed, and then, the process can be returned to an ordinary operation. Now, this embodiment will be described below by referring to the DMA transfer controller shown in FIG. 1 or FIG. 13.

The inhibition and cancellation of the time division process of the DMA transfers are processed by performing a prescribed command to the control unit 123 from the processor. As methods for inhibiting the time division of the DMA transfers for each of the logical processors, there is a method that a case in which the bus occupation time is set to a specific value, for instance, a maximum value or 0 is considered to be the inhibition of the time division, or a method that a time division inhibiting flag accompanied with the bus occupation time is provided. Further, the inhibition of the time division for each of the individual DMA transfer requests is realized by providing the time division inhibiting flag in a part of the transfer parameters as shown in FIG. 17.

In the DMA transfers in which the time division process is inhibited, a bus occupation time monitor function by the time measuring unit 1231 is suppressed irrespective of a bus occupation time value or the number of transfer data capable of occupying the bus and the DMA transfer that is currently performed is not interrupted and performed until it is completed.

As described above, the mechanism for inhibiting and canceling the time division process of the DMA transfer is provided. Thus, when the DMA transfer requests accompanied with the highly emergent application are inconveniently subjected to the division process, the DMA transfer requests can be preferentially processed at a time.

Seventh Embodiment

Figure 18:
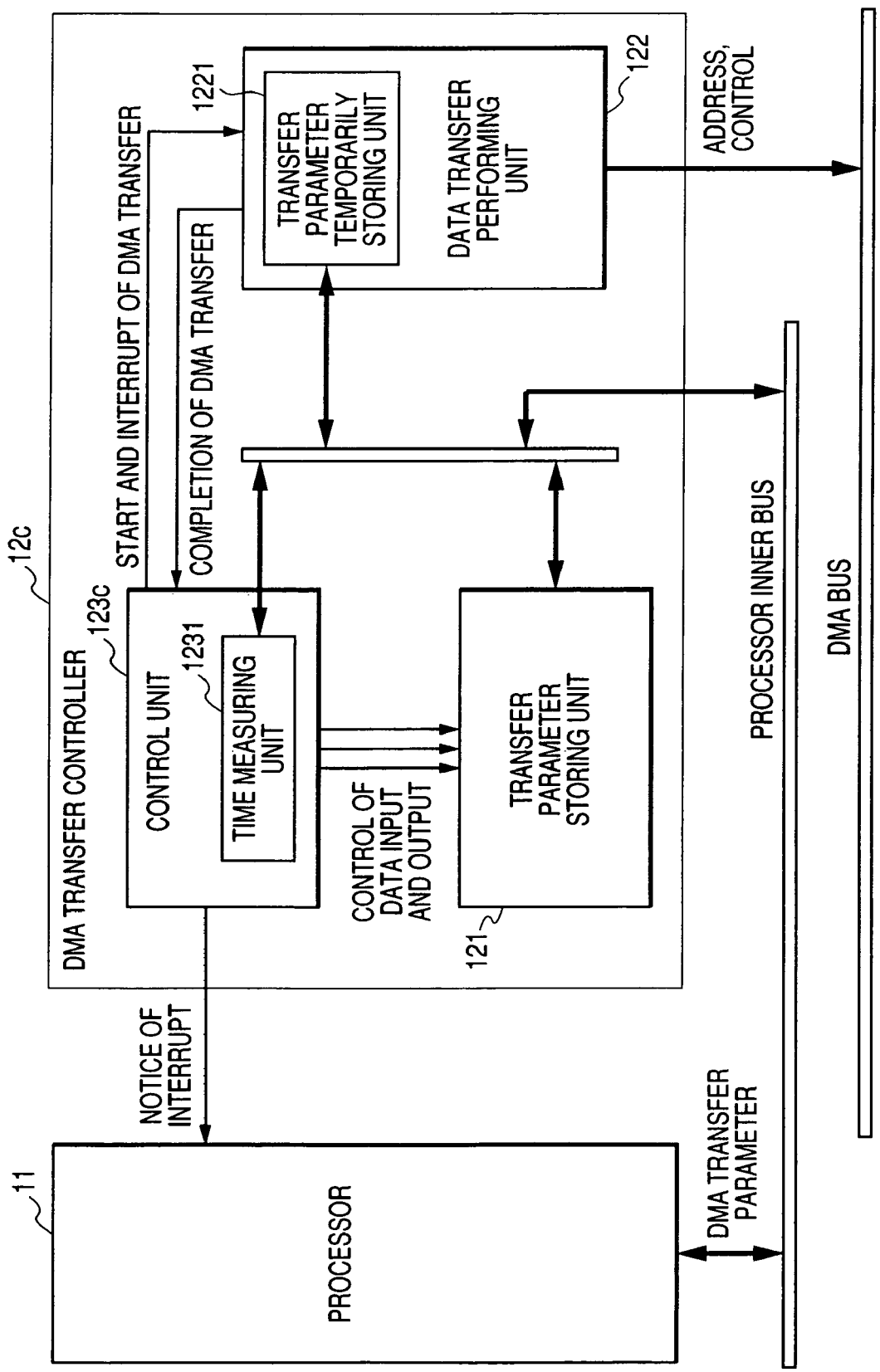
FIG. 18 is a block diagram showing the structure of a DMA transfer controller according to a seventh embodiment of the present invention.

FIG. 18 is a block diagram showing the structure of a DMA transfer controller according to a seventh embodiment of the present invention. In the DMA transfer controller 12c shown in FIG. 18, a transfer parameter temporarily storing unit 1221 is provided in the data transfer performing unit 122 of the DMA transfer controller 12 shown in FIG. 1 and a control function corresponding thereto is added to a control unit 123c.

In the transfer parameter temporarily storing unit 1221, the transfer parameters from the transfer parameter storing unit 121 are copied by the control unit 123c upon start of the execution of the DMA transfers and used for calculating addresses upon execution of the DMA transfers in the data transfer performing unit 122. Thus, the data transfer performing unit 122 does not access the transfer parameter storing unit 121 until the DMA transfers are interrupted or completed.

According to the above-described structure, the transfer parameters stored in the transfer parameter storing unit 121 does not need to be referred to every time the addresses are calculated during the execution of the DMA transfers. Accordingly, consumed power necessary for the access to a memory can be saved. Further, the queuing of the transfer parameters from the processor does not contend with the access. Especially, when the transfer parameter storing unit 121 is composed of a one-port memory, a waiting time of the processor side is decreased to improve the effective efficiency of the processor.

Eighth Embodiment

Figure 19:
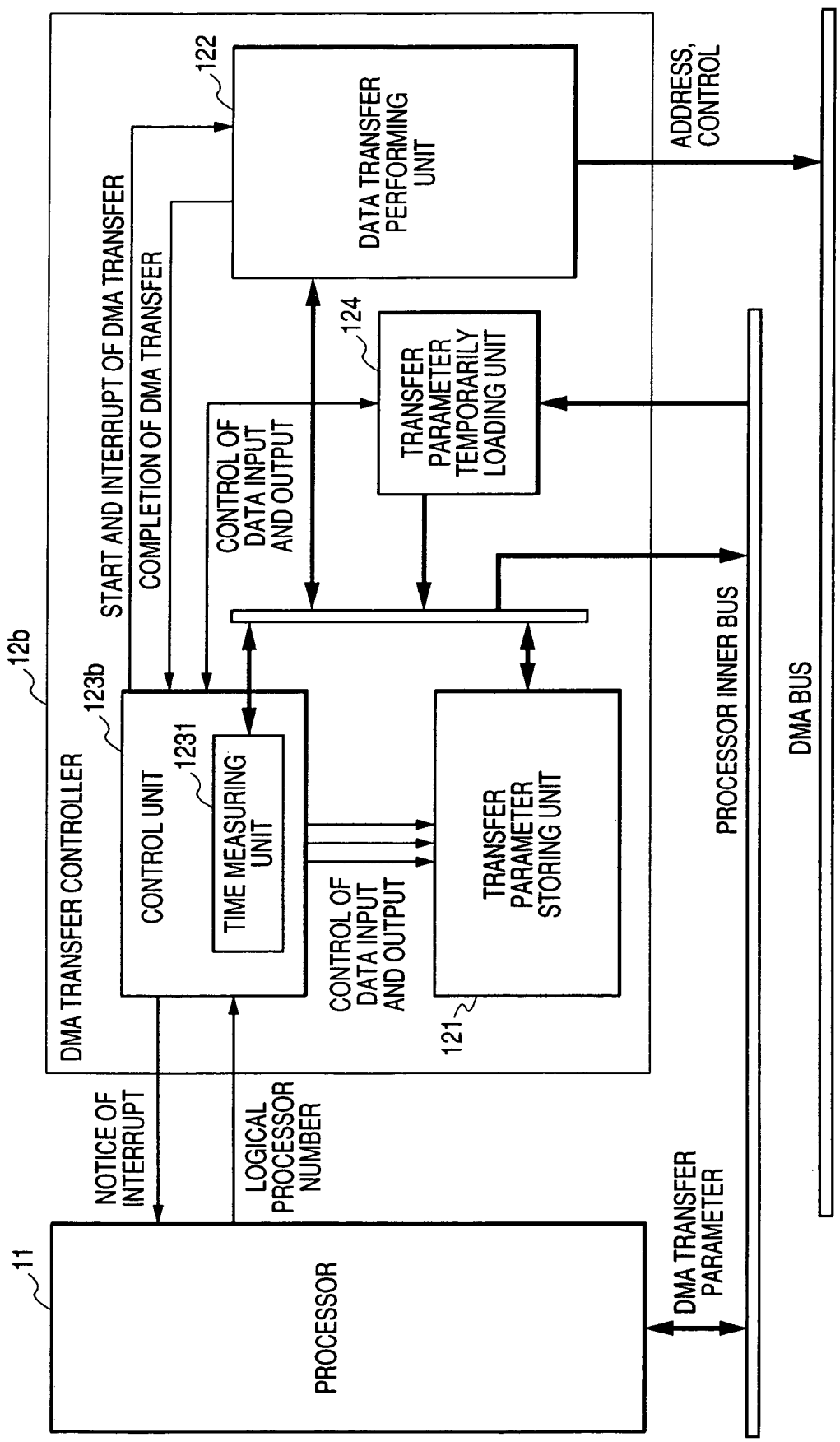
FIG. 19 is a block diagram showing the structure of a DMA transfer controller according to an eighth embodiment of the present invention.

FIG. 19 is a block diagram showing the structure of a DMA transfer controller according to an eighth embodiment of the present invention. In the DMA transfer controller 12b shown in FIG. 19, a transfer parameter temporarily loading unit 124 used as a buffer upon queuing and a control function corresponding thereto is added to a control unit 123b.

Figure 20:
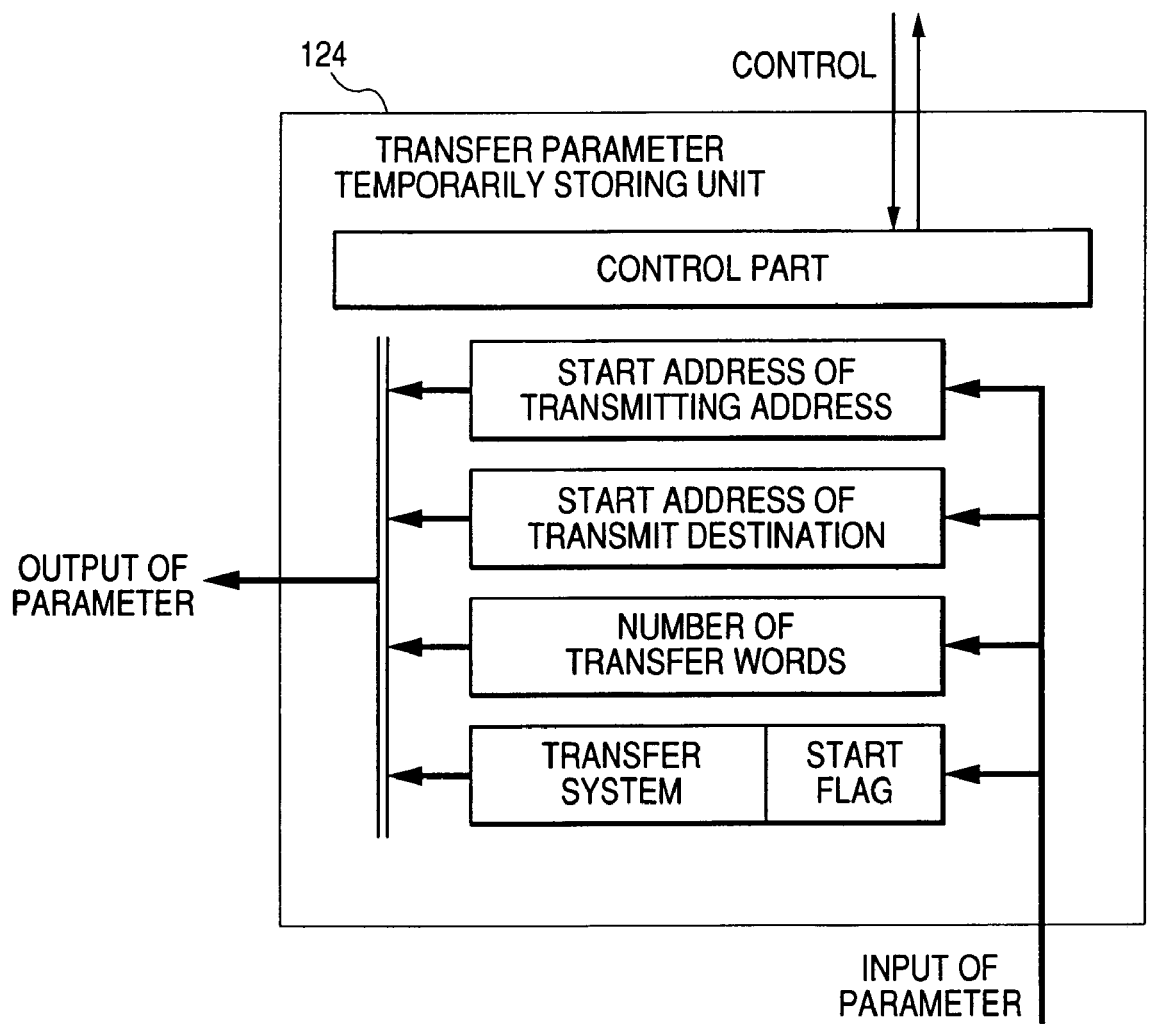
FIG. 20 is a block diagram showing the structural example of a transfer parameter temporarily loading unit 124 in the eighth embodiment of the present invention.

FIG. 20 is a block diagram showing a structural example of the transfer parameter temporarily loading unit 124. The transfer parameter temporarily loading unit 124 can temporarily store one set of transfer parameters. When the transfer parameters queue, after parameter values respectively forming the transfer parameters are set to the transfer parameter temporarily storing unit 124, a start flag is set to update the queue control information and transfer the one set of transfer parameters to the transfer parameter storing unit 121.

While the transfer parameters are transferred from the transfer parameter temporarily loading unit to the transfer parameter storing unit 121, the processor controls the access of the queuing to the control unit 123b to be waited for. In such a way, while the transfer parameters are stored in the transfer parameter storing unit 121, the parameter values buffered in the transfer parameter temporarily loading unit 124 are prevented from changing to cause an unexpected operation.

Ninth Embodiment

Figure 21:
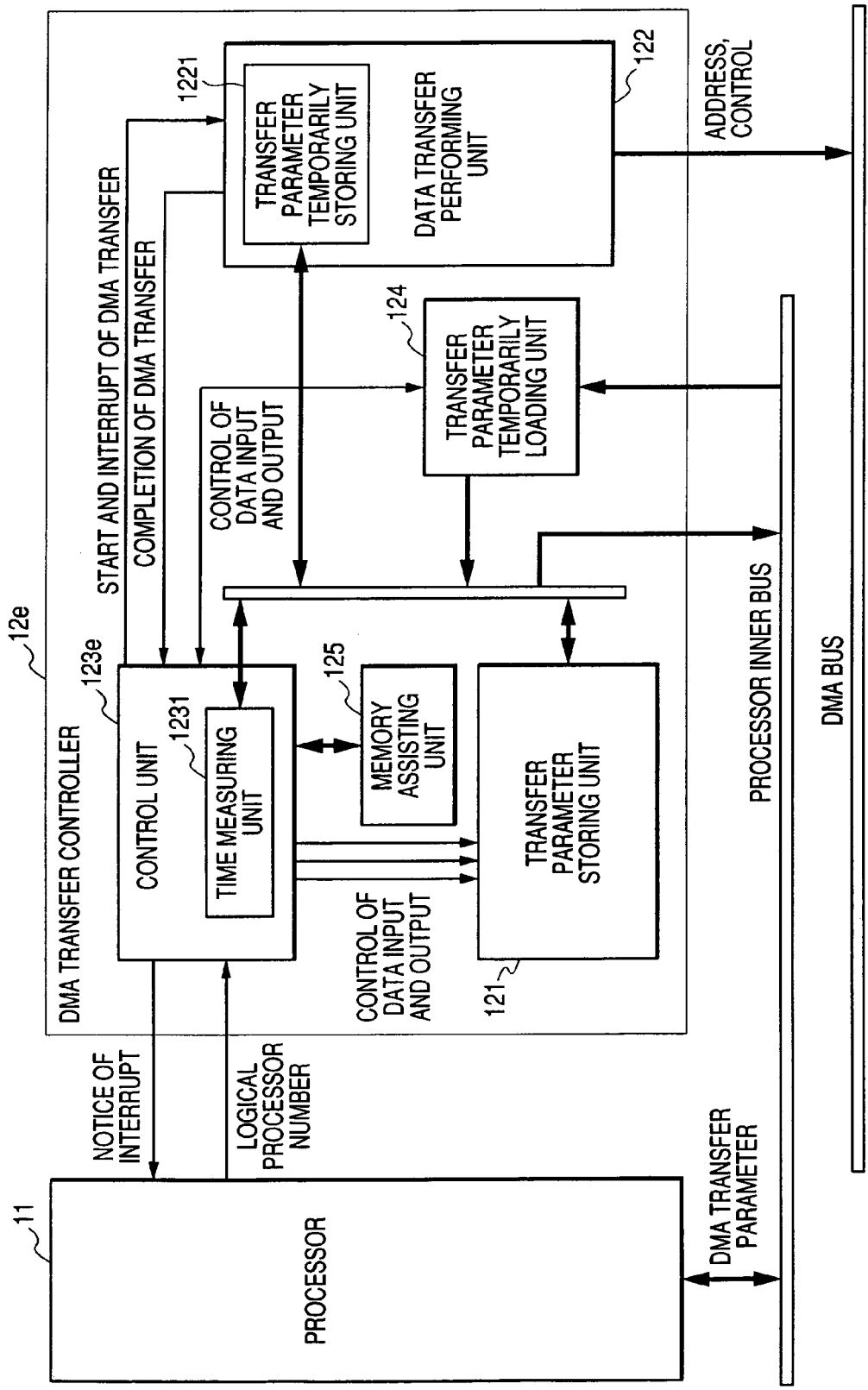
FIG. 21 is a block diagram showing the structure of a DMA transfer controller according to a ninth embodiment of the present invention.

FIG. 21 is a block diagram showing the structure of the DMA transfer controller according to a ninth embodiment of the present invention. In the DMA transfer controller 12e shown in FIG. 21, the transfer parameter temporarily storing unit 1221 in the seventh embodiment and the transfer parameter temporarily loading unit 124 in the eighth embodiment are provided in the DMA transfer controller 12 shown in FIG. 1. A memory assisting unit 125 is newly provided and a control function corresponding thereto is added to a control unit 123e.

In the memory assisting unit 125, a queue active flag showing whether or not the transfer parameters queue for each of the logical processors is stored. The control unit 123e cyclically checks the queue active flag corresponding to each logical processor of the memory assisting unit 125 to decide whether or not there is the DMA transfer request for each of the logical processors.

The queue active flag is set when any of the queuing transfer parameters is validated for the relevant logical processor and reset when all the DMA transfers are completed. While the queue active flag is updated, the processor controls the access of the queuing to the control unit 123e to be waited for.

Thus, after the DMA transfers for each of the logical processors are completed, whether or not there is the DMA transfer request in a next logical processor can be decided. When there is no DMA transfer request, the transfer parameter storing unit 121 does not need to be accessed, a process can be performed at high speed and consumed power can be reduced at the same time. Further, the queue active flag is provided and used as described above. Thus, when the DMA transfer controller is activated, the queue control information does not need to be initialized. Therefore, the queue active flag is effective especially when the transfer parameter storing unit 121 is composed of a memory.

FIG. 22 is a block diagram showing a structural example having a path for connecting the memory assisting unit 125 to a processor inner bus. Thus, the queue active flag can be directly accessed from outside the DMA transfer controller.

For instance, when the processor is brought into an improper state, the operation of the processor may be stopped to enter a debugging mode. In such a case, the queue active flag can be directly externally accessed. Thus, an effective analyzing means can be provided.

Further, in the debugging mode, when the queue active flag or the queue control information is improperly operated, and then, the debugging mode is returned to an ordinary operation, an inconsistency may be generated between the state of the queue active flag and the queue control information to bring the processor into an improper state. To make preparations for such a case, when the inconsistency is generated between the queue active flag and the queue control information, a function for correcting the state of the queue active flag in accordance with the queue control information is effectively provided.

In the DMA transfer controller according to the present invention, since the bus occupation elapse time for each of the logical processors is limited to the bus occupation time value, the scheduling of the DMA transfers can be effectively carried out in real time processes, a system can be avoided from being broken down and the real time characteristics of the processes can be certainly assured. Thus, the DMA transfer controller of the present invention is useful as a DMA transfer controller capable of scheduling the DMA transfers.

What is claimed is:

1. A DMA transfer controller comprising:
a transfer parameter storing unit for storing a bus occupation time value and transfer parameters of one set or a plurality of sets of DMA transfers for a plurality of logical processors performed by a main processor;
a data transfer performing unit for performing the DMA transfer on the basis of the transfer parameters;
a control unit for controlling the receive and transmit of the transfer parameters and the start and the interruption of the DMA transfers; and
a time measuring unit for starting to measure bus occupation elapse time when a first DMA transfer is started for each of the logical processors,
wherein, when the bus occupation elapse time reaches the bus occupation time value, the control unit interrupts the DMA transfer that is performed to start the DMA transfers based on the transfer parameters related to the logical processors of a prescribed sequence, and
wherein, when all DMA transfers related to a certain logical processor are completed before the bus occupation elapse time reaches the bus occupation time value, the control unit starts the DMA transfers based on the transfer parameters related to the logical processors of the prescribed sequence.

2. A DMA transfer controller comprising:
a transfer parameter storing unit for storing the number of transfer data capable of occupying a bus and transfer parameters of one set or a plurality of sets of DMA transfers for a plurality of logical processors performed by a main processor;
a data transfer performing unit for performing the DMA transfer on the basis of the transfer parameters;
a control unit for controlling the receive and transmit of the transfer parameters and the start and the interruption of the DMA transfers; and
a time measuring unit for starting to measure the number of transfer data capable of occupying the bus when a first DMA transfer is started for each of the logical processors,
wherein, when the number of bus transfer data reaches the number of transfer data capable of occupying the bus, the control unit interrupts the DMA transfer that is performed to start the DMA transfers based on the transfer parameters related to the logical processors of a prescribed sequence, and
wherein when all DMA transfers related to a certain logical processor are completed before the number of bus transfer data reaches the number of transfer data capable of occupying the bus, the control unit starts the DMA transfers based on the transfer parameters related to the logical processors of the prescribed sequence.

3. A DMA transfer controller comprising:
a transfer parameter storing unit for storing a bus occupation time value and transfer parameters of one set or a plurality of sets of DMA transfers for a plurality of logical processors performed by a main processor;
a data transfer performing unit for performing the DMA transfer on the basis of the transfer parameters;
a control unit for controlling the receive and transmit of the transfer parameters and the start and the interruption of the DMA transfers; and
a time measuring unit for starting to measure bus occupation elapse time when a first DMA transfer is started for each of the logical processors,
wherein, when the bus occupation elapse time reaches the bus occupation time value, the control unit interrupts the DMA transfer that is performed to start the DMA transfers based on the transfer parameters related to the logical processors of a prescribed sequence, and
wherein the prescribed sequence is cyclic and all DMA transfer processes related to the logical processors for which a DMA transfer request is not present are skipped.

4. A DMA transfer controller comprising:
a transfer parameter storing unit for storing a bus occupation time value and transfer parameters of one set or a plurality of sets of DMA transfers for a plurality of logical processors performed by a main processor;
a data transfer performing unit for performing the DMA transfer on the basis of the transfer parameters;
a control unit for controlling the receive and transmit of the transfer parameters and the start and the interruption of the DMA transfers; and
a time measuring unit for starting to measure bus occupation elapse time when a first DMA transfer is started for each of the logical processors,
wherein, when the bus occupation elapse time reaches the bus occupation time value, the control unit interrupts the DMA transfer that is performed to start the DMA transfers based on the transfer parameters related to the logical processors of a prescribed sequence, and
wherein, in the transfer parameter storing unit, the plurality of sets of transfer parameters for the plurality of processors are queued to a FIFO structure.

5. A DMA transfer controller comprising:
a transfer parameter storing unit for storing a bus occupation time value and transfer parameters of one set or a plurality of sets of DMA transfers for a plurality of logical processors performed by a main processor;
a data transfer performing unit for performing the DMA transfer on the basis of the transfer parameters;
a control unit for controlling the receive and transmit of the transfer parameters and the start and the interruption of the DMA transfers;
a time measuring unit for starting to measure bus occupation elapse time when a first DMA transfer is started for each of the logical processors, and
a mechanism for nullifying the transfer parameters for each of the logical processors;
wherein, when the bus occupation elapse time reaches the bus occupation time value, the control unit interrupts the DMA transfer that is performed to start the DMA transfers based on the transfer parameters related to the logical processors of a prescribed sequence.

6. A DMA transfer controller comprising:
a transfer parameter storing unit for storing the number of transfer data capable of occupying a bus and transfer parameters of one set or a plurality of sets of DMA transfers for a plurality of logical processors performed by a main processor;
a data transfer performing unit for performing the DMA transfer on the basis of the transfer parameters;
a control unit for controlling the receive and transmit of the transfer parameters and the start and the interruption of the DMA transfers; and a time measuring unit for starting to measure the number of transfer data capable of occupying the bus when a first DMA transfer is started for each of the logical processors, wherein, when the number of bus transfer data reaches the number of transfer data capable of occupying the bus, the control unit interrupts the DMA transfer that is performed to start the DMA transfers based on the transfer parameters related to the logical processors of a prescribed sequence, and wherein the prescribed sequence is cyclic and all DMA transfer processes related to the logical processors for which a DMA transfer request is not present are skipped.

7. A DMA transfer controller comprising:

a transfer parameter storing unit for storing the number of transfer data capable of occupying a bus and transfer parameters of one set or a plurality of sets of DMA transfers for a plurality of logical processors performed by a main processor;

a data transfer performing unit for performing the DMA transfer on the basis of the transfer parameters;

a control unit for controlling the receive and transmit of the transfer parameters and the start and the interruption of the DMA transfers; and a time measuring unit for starting to measure the number of transfer data capable of occupying the bus when a first DMA transfer is started for each of the logical processors, wherein, when the number of bus transfer data reaches the number of transfer data capable of occupying the bus, the control unit interrupts the DMA transfer that is performed to start the DMA transfers based on the transfer parameters related to the logical processors of a prescribed sequence, and wherein, in the transfer parameter storing unit, the plurality of sets of transfer parameters for the plurality of processors are queued to a FIFO structure.

8. The DMA transfer controller according to claim 4 or 7, wherein, when the transfer parameters queue by exceeding the prescribed maximum number of the transfer parameters, the control unit informs the main processor of the generation of an error.

9. The DMA transfer controller according to claim 4 or 7, wherein one set of transfer parameters can queue before the first queue of the transfer parameters as an emergent queue.

10. The DMA transfer controller according to claim 9, wherein, while the emergent queue queues, when the queuing operation of the emergent queue is to be further carried out, the control unit informs the main processor of the generation of an error.

11. The DMA transfer controller according to claim 4 or 7, wherein queue control information related to the queuing transfer parameters is stored in the transfer parameter storing unit for each of the logical processors and the queue control information includes at least the valid/invalid information of individual transfer parameters.

12. The DMA transfer controller according to claim 4 or 7, wherein queue control information related to the queuing transfer parameters is stored in the transfer parameter storing unit for each of the logical processors and the queue control information includes at least the holding information of individual transfer parameters.

13. The DMA transfer controller according to claim 4 or 7, wherein a transfer parameter temporarily loading unit is used as a buffer of one set of transfer parameters when the transfer parameters queue and the control unit uses the transfer parameters stored in the transfer parameter temporarily loading unit to form the queue control information related to the queuing transfer parameters for each of the logical processors and stores the transfer parameters and the queue control information in the transfer parameter storing unit.

14. The DMA transfer controller according to claim 4 or 7, wherein a queue active flag showing whether or not the transfer parameters queue is provided for each of the logical processors and the control unit cyclically checks the queue active flag to decide whether or not there is a DMA transfer request for each of the logical processors.

15. The DMA transfer controller according to claim 14, wherein, when any of the transfer parameters related to the logical processors is validated, the queue active flag is set, and when all the DMA transfers concerning the logical processors are completed, the queue active flag is reset.

16. The DMA transfer controller according to claim 15, wherein when any of the queue active flags is reset, the set request of the reset queue active flag is waited.

17. The DMA transfer controller according to claim 14, wherein there is a path capable of directly accessing the queue active flag outside the DMA transfer controller.

18. The DMA transfer controller according to claim 14, wherein, when an inconsistency is generated between the state of the queue active flag and the queue control information, the state of the queue active flag is corrected in accordance with the queue control information.

19. A DMA transfer controller comprising:

a transfer parameter storing unit for storing the number of transfer data capable of occupying a bus and transfer parameters of one set or a plurality of sets of DMA transfers for a plurality of logical processors performed by a main processor;

a data transfer performing unit for performing the DMA transfer on the basis of the transfer parameters;

a control unit for controlling the receive and transmit of the transfer parameters and the start and the interruption of the DMA transfers; and a time measuring unit for starting to measure the number of transfer data capable of occupying the bus when a first DMA transfer is started for each of the logical processors, and a mechanism for nullifying the transfer parameters for each of the logical processors;

wherein, when the number of bus transfer data reaches the number of transfer data capable of occupying the bus, the control unit interrupts the DMA transfer that is performed to start the DMA transfers based on the transfer parameters related to the logical processors of a prescribed sequence.

* * * * *